(12) United States Patent
Davis et al.

(10) Patent No.: US 8,022,379 B2
(45) Date of Patent: Sep. 20, 2011

(54) BEAM POSITION SENSOR FOR OPTICAL SWITCH MODULES

(75) Inventors: Edward Davis, Kihei, HI (US); Yoshinao Taketomi, San Diego, CA (US); Larry DiRuscio, Carlsbad, CA (US)

(73) Assignee: Trex Enterprises Corp., San Diego, CA (US)

( * ) Notice: Subject to any disclaimer, the term of this patent is extended or adjusted under 35 U.S.C. 154(b) by 115 days.

(21) Appl. No.: 11/728,345

(22) Filed: Mar. 26, 2007

(65) Prior Publication Data

US 2008/0240716 A1 Oct. 2, 2008

(51) Int. Cl.
*H04J 14/00* (2006.01)
*G01J 1/20* (2006.01)

(52) U.S. Cl. ........ 250/555; 250/551

(58) Field of Classification Search ........ 250/550, 250/551; 398/49
See application file for complete search history.

(56) References Cited

U.S. PATENT DOCUMENTS

| | | | | |
|---|---|---|---|---|
| 3,759,618 A | * | 9/1973 | Rogers et al. | 356/619 |
| 4,833,318 A | * | 5/1989 | Yonekura et al. | 250/239 |
| 5,978,053 A | * | 11/1999 | Giles et al. | 349/17 |

* cited by examiner

*Primary Examiner* — Tony Ko
(74) *Attorney, Agent, or Firm* — John R. Ross

(57) ABSTRACT

A beam direction sensor for determining the direction of each beam in an array of light beams. The invention basically consists of a screen positioned to intersect the array of beams and a video camera to record the position of the images of the intersections. The screen can be any of a wide variety of screens that produce an image of the beams when illuminated with the beam. These include frosted glass and various diffusers. A preferred screen is a holographic diffusers.

7 Claims, 30 Drawing Sheets

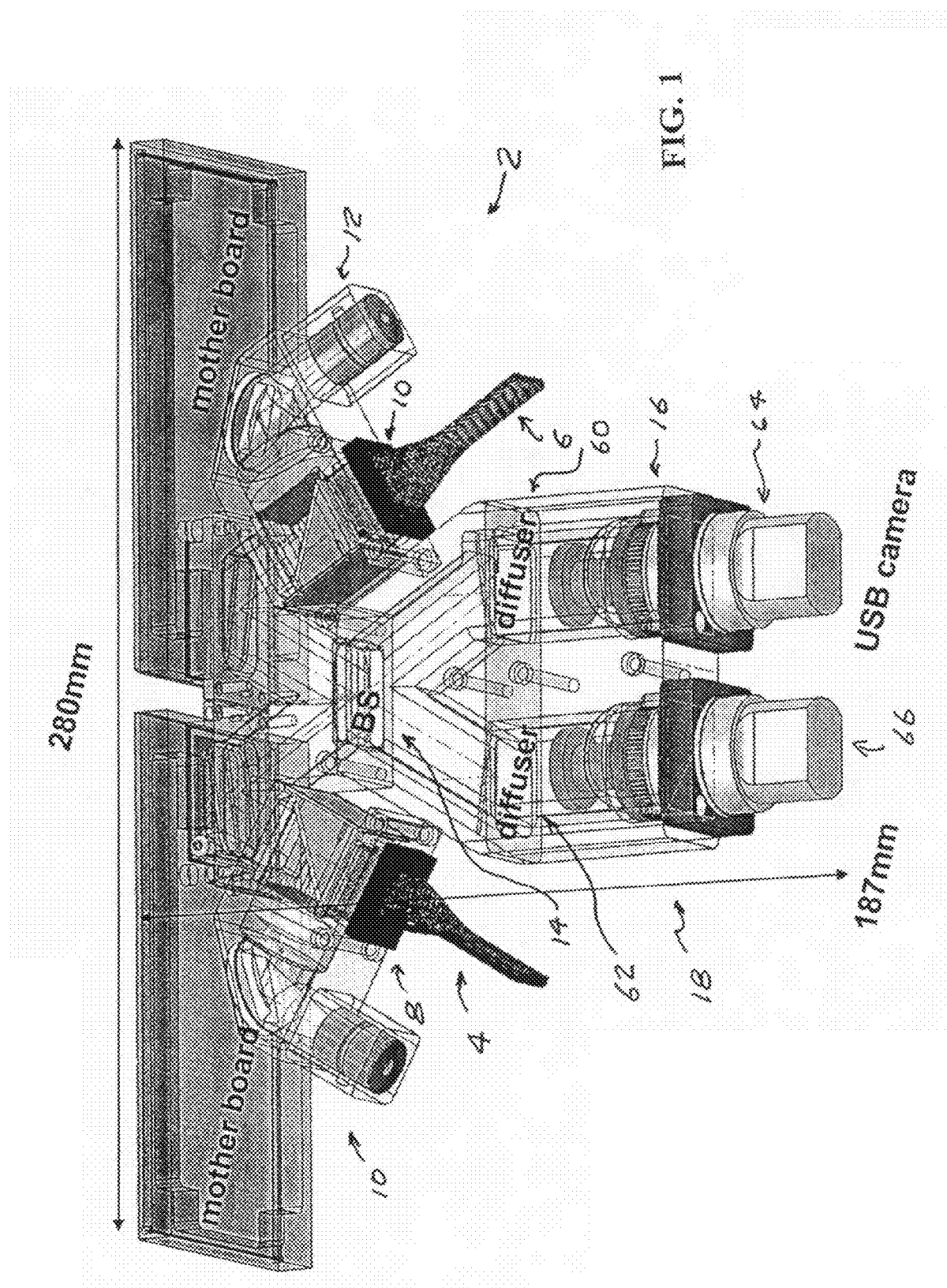

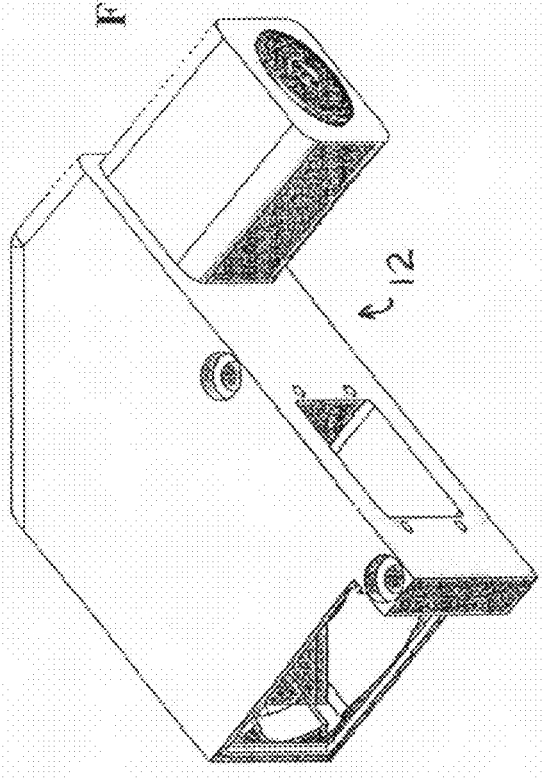
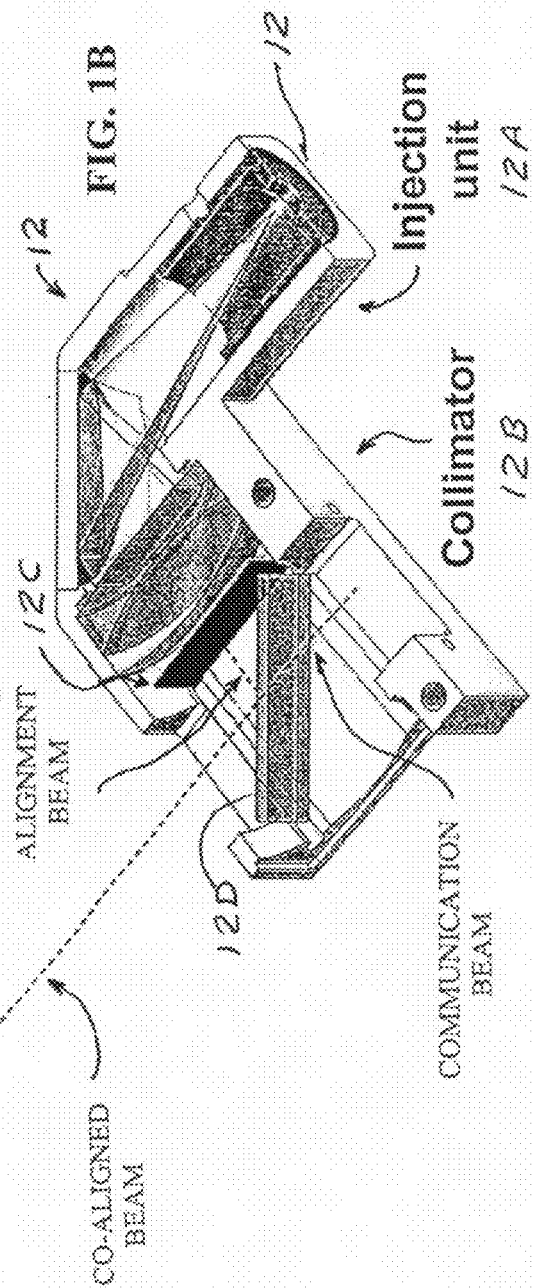

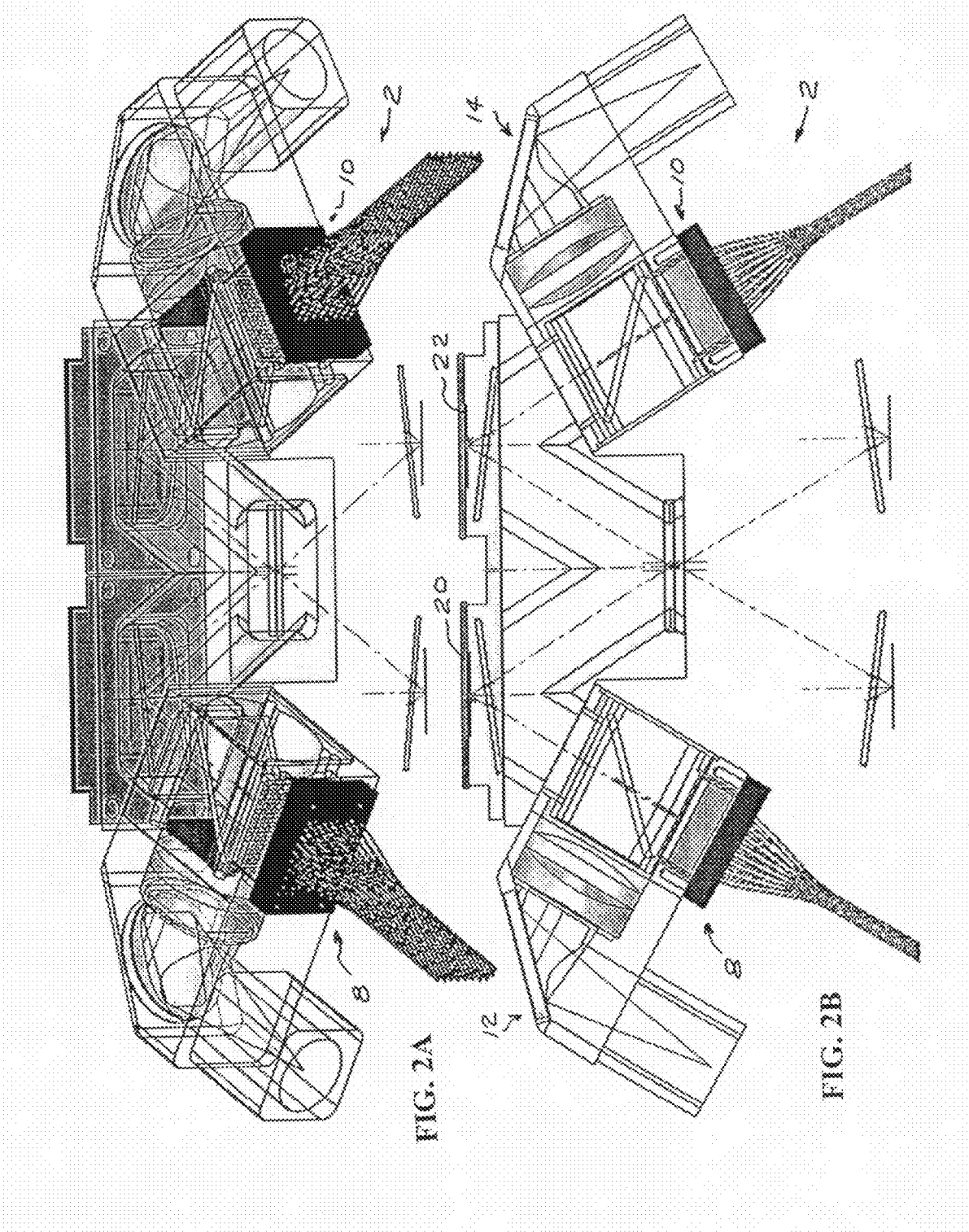

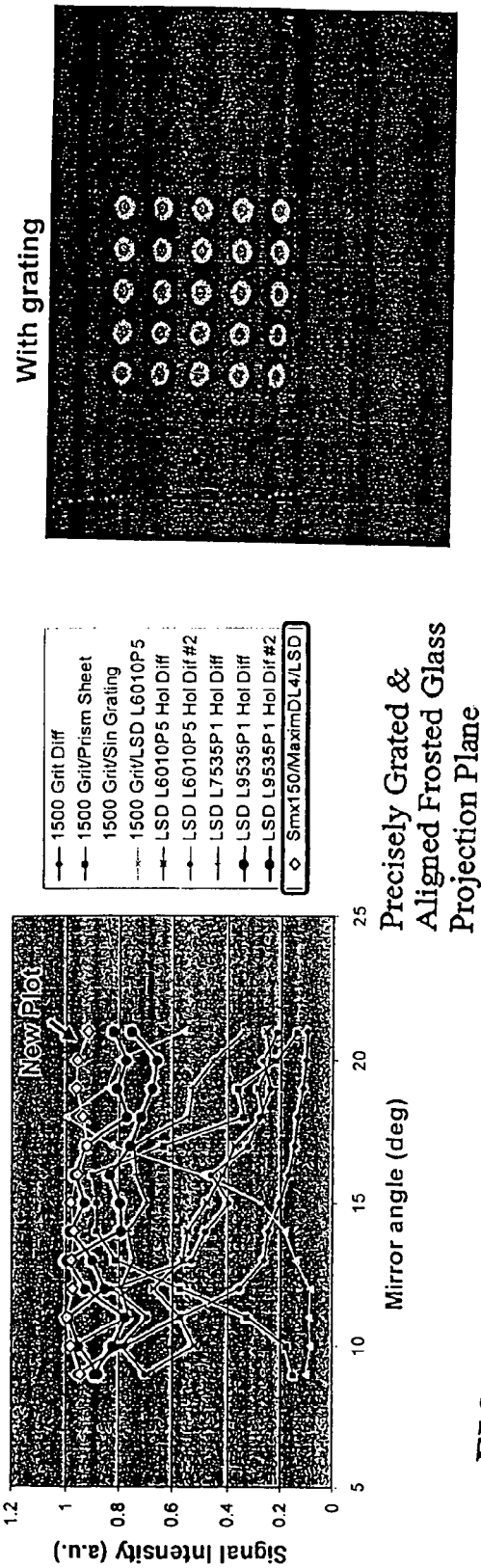
FIG. 3A
FIG. 3B
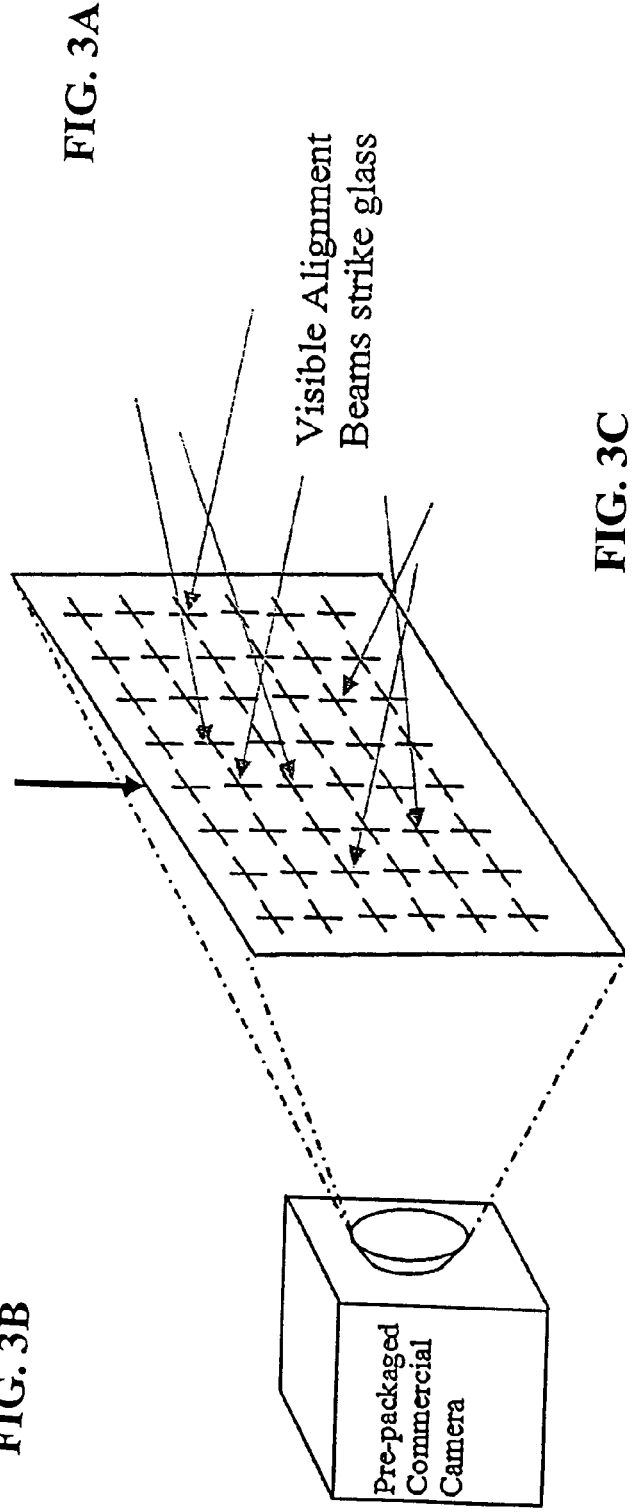
FIG. 3C

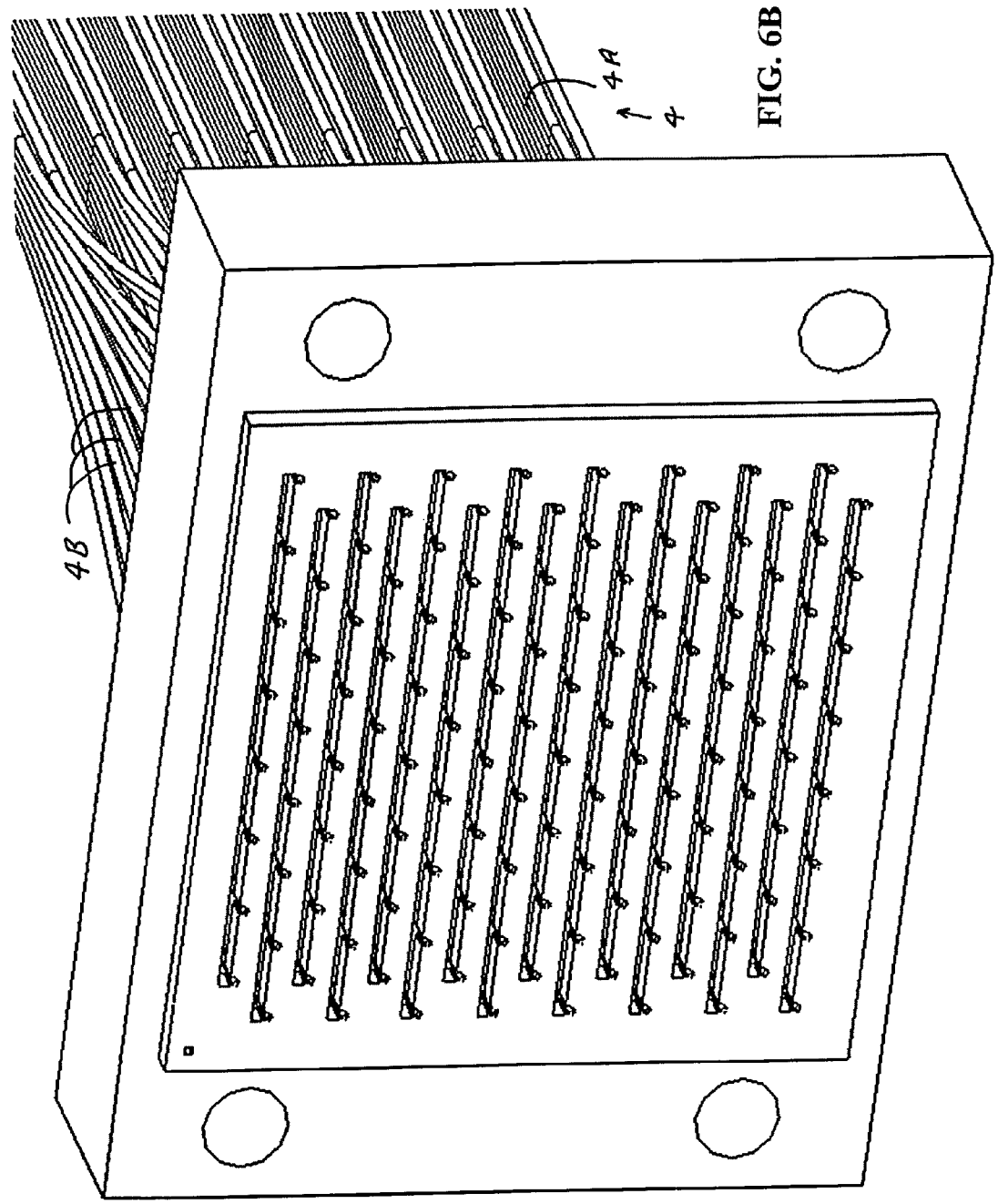

Start with Double Silicon on Insulator Wafer

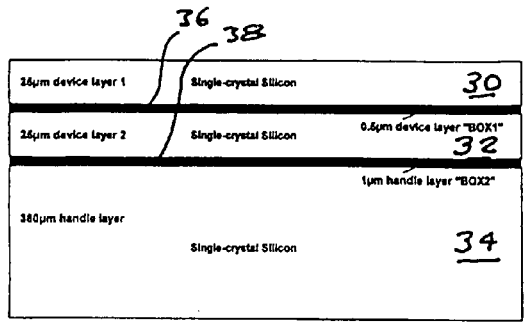

FIG. 9A

Oxidize wafer – SiO2

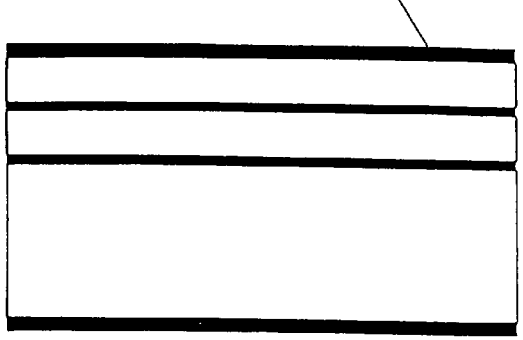

FIG. 9B

Pattern Oxide on Frontside of Wafer
- Photoresist and contact mask used to pattern oxide.
- After oxide etched, photoresist is removed

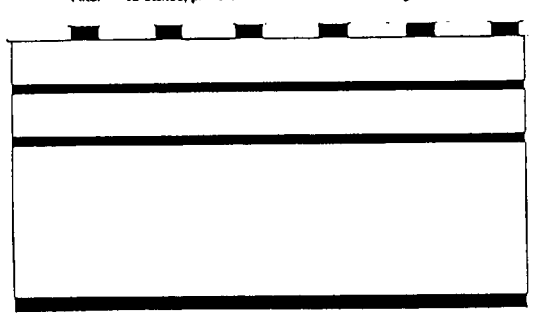

FIG. 9C
Oxide etch

Apply Resist Mask
Lithographic Misalignment between the two masks

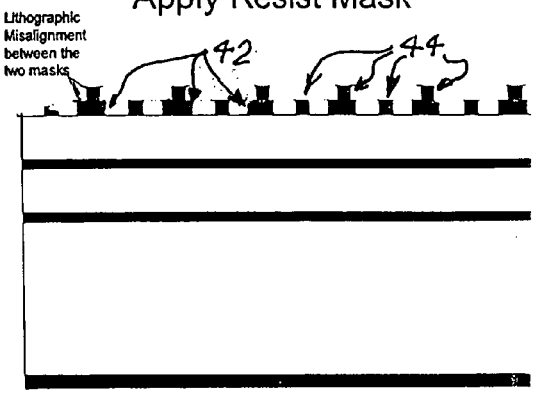

FIG. 9D

Self Alignment:
The two masks are now aligned to each other

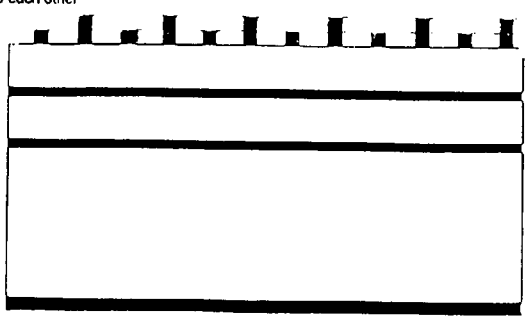

FIG. 9E

Silicon DRIE (Deep Reactive Ion Etch)
Silicon etch stops on Oxide (ie. Etches SiO2 ~100x slower than Silicon)

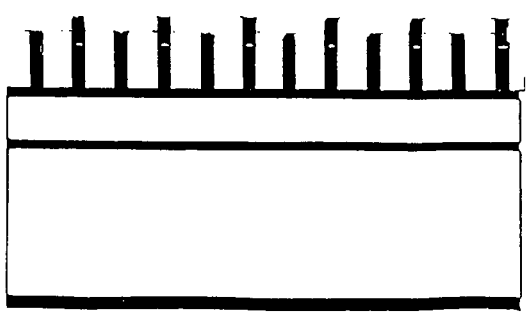

FIG. 9F

Photoresist Stripped

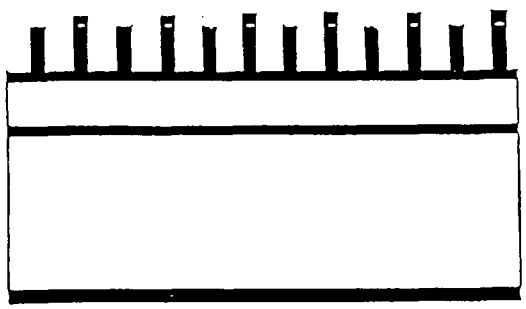

FIG. 9G

Blanket Oxide Etch

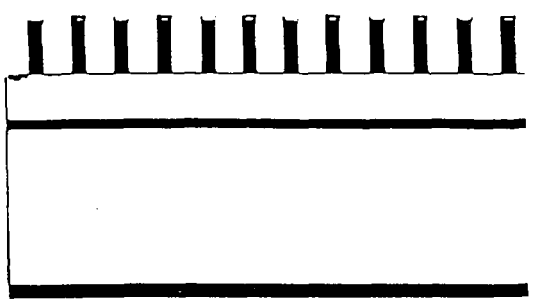

FIG. 9H

Backside Lithography and Etch
Photoresist applied and patterned with contact mask
Oxide etch, then Silicon DRIE, then another Oxide etch to remove BOX2

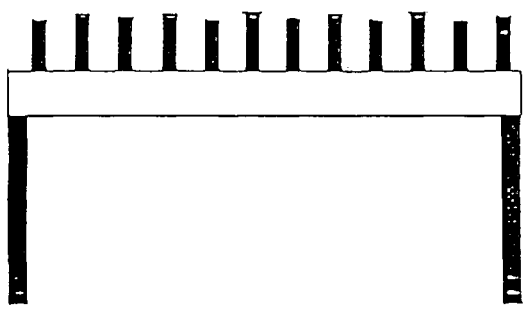

FIG. 9I

Silicon DRIE

Self Alignment: BOX1 masks the Device Layer 2 etch

Unprotected Silicon in DL1 and DL2 etched simultaneously

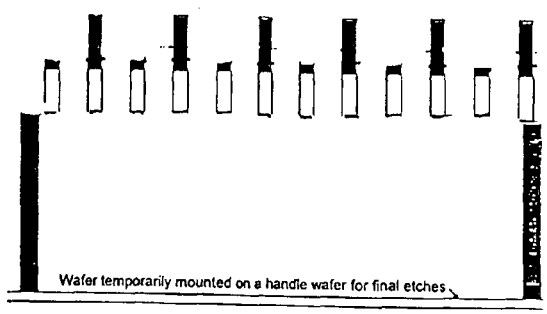

FIG. 9J

Oxide Etch

Removes oxide from Ground Plane (DL2) and tops of comb fingers

Exposes Silicon surface for mirror metallization

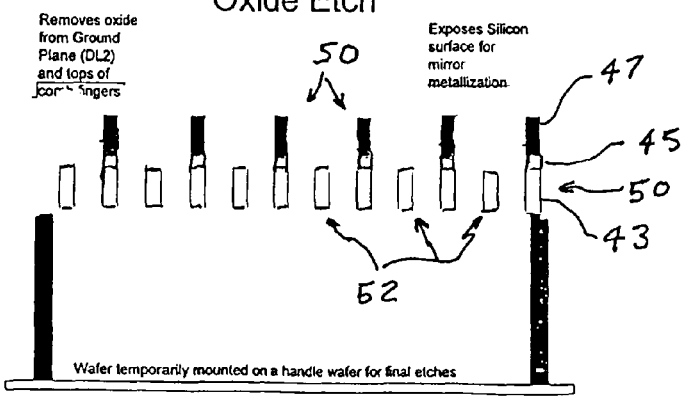

FIG. 9K

BEAM POSITION SENSOR FOR OPTICAL SWITCH MODULES

The present invention relates to fiber optic communication equipment and in particular to fiber optic switches and fiber optic switch modules.

CROSS REFERENCE TO RELATED APPLICATIONS

This application is a companion application to the following related applications filed concurrently with this application: Ser. No. 11/728,435, Optical Switch Module, Ser. No. 11/728,362, MEMS Mirror Array and Control, Ser. No. 11/728,344, Optical Fiber Array Alignment Unit, and Ser. No. 11/728,335, Optical Switch with Co-Axial Alignment Beam, all of which are incorporated herein by reference.

BACKGROUND OF THE INVENTION

Beam Position Sensors

A great many beam position sensors are available for sensing positions of light beams. These sensors include cameras that are normally used for imaging scenes but could be used for determining the positions of individual light beams. Digital video sensors are often used for sensing positions of light beams. An important use of beam position sensors is to provide feedback information for directing a light beam into the aperture of an optical fiber.

Fiber Optic Communication

Over the past few decades, the telecommunications industry has exploded, and the incorporation of optical fiber into this industry is revolutionizing the way information is transmitted. Communication systems which use optical fiber as the transmission media offer some significant advantages over past copper-based systems. These advantages include higher bandwidths and transmission rates, lower transmission losses, and greater signal isolation. There exist in the United States many million miles of optical fibers. Information must be routed through this maze of fibers at the speed of light from millions of transmitters to millions of receivers.

Fiber Optic Multiplexing and De-Multiplexing

In a typical fiber optic communication system several fibers may be bundled together with many separate signals combined within the light beam carried in each of the fibers in the bundle. This combination of separate signals into a single beam carried by a single fiber is called multiplexing the signals. Both time division and frequency division multiplexing may be utilized. In typical fiber optic systems each signal carries with it a code so that traffic controls in the system can direct the signal to its proper destination. Light beams comprised of many signals typically travel serially through several or many fibers before reaching its sub-destination or final destination. Individual signals are collected into a single fiber in a process called multiplexing and separated out from other signals in a beam in processes called de-multiplexing. This operation may occur once or several times during the transit of information in the form of these light signals from sender to receiver.

FIG. 13 A depicts de-multiplexing and FIG. 13B depicts multiplexing. FIG. 13C shows a prior art static cross connection with two de-multiplexers and two multiplexers showing how signals carried at four separate wavelength ranges on two separate fibers can be switched to two other fibers. Optical filters that transmit a single wavelength range and reflect all other wavelength ranges are often used to separate wavelength ranges in multiplexers and de-multiplexers. A well known filter is the thin film filter as shown in FIG. 13D. These filters are typically built up on a glass substrate with thin films of one or more sets of ¼ wave dielectric reflectors on both sides of a ½ wave cavity. FIG. 13E shows the result of one, two and three sets of ¼ wave reflectors and ½ wave cavities. FIG. 13F shows how these narrow band filters can be used to produce a de-multiplexer. A multiplexer results from switching the directions indicated by the arrows.

Adjusting Fiber Routes

Traffic controls can route a particular signal from sender through many fibers to the receiver without changing the way the various optical fibers of the system are connected. However, as particular fiber routes become crowded, the connections between fibers must be modified to reduce the crowdedness or to route the signals more efficiently. This is the job of the fiber optic switch. This operation can be done by changing the actual connections between fibers in a fiber switch unit. Historically, fast switching of optical-beam routes through optical fibers has been accomplished using hybrid optical-electrical-optical switches for detection and conversion of optical signals entering the switch from a first fiber to an electrical signal that is used to produce a new optical signal for transmission over a second optical fiber.

MEMS Mirrors

MEMS mirrors are lithographically produced mirrors that are operated with voltage signals applied through integrated circuits produced with similar lithographic techniques. These mirrors typically are very tiny having dimensions measured in millimeters or fractions of millimeters. They are designed with extremely tight tolerances necessary for proper angular alignment of the various reflective elements, and usually require very sophisticated feedback control systems.

Automatic all Optical Cross Connect Switches

Recently, a number of optical cross connect switches have become available for switching optical signals directly from one fiber to another, thereby eliminating the need to convert the optical signal to an interim electrical signal. These optical switches incorporate various optical switch elements, such as mirrors, prisms, fiber collimators, and complicated drive mechanisms, to route optical signals through the switch. For some optical switches, MEMS mirrors have been utilized. All optical switches are described in the following patents recently issued which contain features similar to some of the features of the present invention: U.S. Pat. No. 7,190,509, Optically Addressed MEMS and U.S. Pat. No. 7,177,497, Porous Silicon Filter for Wavelength Multiplexing and De-Multiplexing, both of which are incorporated herein by reference.

Applications of all Optical Automatic Cross Connect Switches

Known uses of all optical cross connect switches include (1) use as the principal component in a automated fiber patch panel, (2) use a component of a reconfigurable optical add drop multiplexer (ROADM) system and (3) use for automatic testing and measurement of optical components and systems.

Automated Fiber Patch Panel

Automated fiber patch panels are the components of a fiber optic communication network where communication routes are established and modified. These panels can be computer controlled to maintain network efficiency, to avoid overload and to respond quickly to fault situations.

Reconfigurable Optical Add Drop Multiplexers

When individual fibers are carrying many separate signals, the network must provide for adding new signals to the fiber and extracting (dropping) other signals. FIG. 13G shows an add-drop unit comprised of multiplexers and de-multiplexers but no switch. This unit would be considered a static unit and requires an operator to reconfigure it. FIG. 13H is a similar unit but with an optical switch that can be remotely operated or programmed to operate automatically. This unit includes tunable transponders permitting control of the wavelengths added. FIG. 13I shows a ROADM comprising four separate optical switches for switching signals among fibers as well as controlling the adding and dropping of signals for local service.

Test and Measurement

Automated all optical cross connect switches can greatly simplify testing of optical components especially components of typical communication networks simultaneously carrying millions of messages.

The Need

A need exist for an inexpensive sensor system for determining beam positions in an array of light beams.

SUMMARY OF THE INVENTION

Beam Direction Sensor

The present invention provides a beam direction sensor for determining the direction of each beam in an array of light beams. The invention basically consists of a screen positioned to intersect the array of beams and a video camera to record the position of the images of the intersections. The screen can be any of a wide variety of screens that produce an image of the beams when illuminated with the beam. These include frosted glass and various diffusers. A preferred screen is a holographic diffusers.

Use in an Optical Cross Connect Switch

An important use of the present invention is as a component in and optical cross connect switch. Two beam direction sensor units are positioned to detect each alignment beam in the first set of alignment beams transmitted through a dichroic mirror. Each of the beam direction sensor units includes an alignment beam detection screen and a video camera for viewing the position of the intersections of the alignment beams with the unit's viewing screen. In these embodiments a MEMS control system includes a processor programmed to provide a closed loop adjustments of pairs of MEMS mirrors (one from each of the two MEMS mirror array) in order to determine appropriate voltage potentials to be applied to the comb drive actuators in order to provide each desired optical path between the two sets of optical fibers. Applicants' tests have shown that once the calibration has been performed there is very little drift in the beam paths under normal conditions. However, significant changes in environmental conditions could require a recalibration. In some embodiments the switch could be adapted to automatically re-calibrate itself periodically or at the direction of operating personnel.

Cross Connect Switch

The all optical cross connect switch utilizes MEMS mirrors for cross connecting optical fibers in a first set of optical fibers to optical fibers in a second set of optical fibers. The optical fibers are preferably arranged in rectangular arrays. These arrays include array sizes such as 4×8, 16×16 and 8×16. A preferred embodiment built and tested by Applicants is a modular optical switch in which an input 8×16 array of optical fibers from sixteen eight-fiber ribbons are cross-connected into an output 8×16 array of optical fibers also from sixteen eight-fiber ribbons.

MEMS Mirror Arrays

The cross connect switch of the present invention includes two MEMS mirror arrays. In preferred embodiments each of the MEMS mirrors are driven in two axes by vertical comb drive actuators.

Fiber-Microlens Positioning Array

The optical fibers in the first set of optical fibers are precisely positioned in a first fiber-microlens positioning array to define a first set of parallel collimated cross-connect communication beam paths, with each collimated cross-connect communication beam path connecting an optical fiber in the first set of optical fibers with a MEMS mirror in a first MEMS mirror array. The optical fibers in the second set of optical fibers are precisely positioned in a second fiber-microlens positioning array to define a second set of parallel collimated cross-connect communication beam paths, with each collimated cross-connect communication beam path connecting an optical fiber in the second set of optical fibers with a MEMS mirror in a second MEMS mirror array. These parallel collimated beam paths establish a correspondence between the first fiber-microlens positioning array and the first microlens array and a correspondence between the second fiber-microlens positioning array and the second microlens array so that each optical fiber in the first positioning array has its own corresponding microlens in the first microlens array and each optical fiber in the second positioning array has its own corresponding microlens in the second microlens array.

Co-Axial Alignment Beams

A first set of alignment beams are added to and aligned co-axially with each of the first set of parallel collimated cross-connect communication beams. A second set of alignment beams are added to and aligned co-axially with each of the second set of parallel collimated cross-connect communication beams.

Dichroic Mirror

In preferred embodiments of the present invention a dichroic mirror is positioned to reflect communication beams from MEMS mirrors in the first MEMS mirror array and to reflect cross connect communication beams from MEMS mirrors in the second MEMS mirror array and to transmit the first set of alignment beams and the second set of alignment beams.

MEMS Control System

A MEMS control system is provided to position the MEMS mirrors in the first and second MEMS mirror arrays to optically connect any of the optical fibers in the first set of optical fibers to any optical fiber in the second set of optical fibers. In preferred embodiments the MEMS control system is adapted to position each MEMS mirror in the first MEMS mirror arrays so as to reflect the cross connect communication beams from its corresponding fiber in the first set of optical fibers off the dichroic mirror and onto to a MEMS mirror in the second set of MEMS mirrors corresponding to a any selected optical fiber in the second set of optical fibers and to position the corresponding MEMS mirror in the second set of MEMS mirrors to direct the communication beam to its corresponding optical fiber in the second set of optical fibers. In preferred embodiments the mirrors are controlled by adjusting voltage potentials applied to the comb drive actuators of the individual mirrors in order to establish desired optical communication paths between optical fibers in the first set of optical fiber and the second set of optical fibers.

V-Groove Fiber-Microlens Positioning Arrays

In preferred embodiments the first and second fiber-microlens positioning arrays include a positioning plate with lithographically-defined sub-micron V-groove alignment features for alignment a set of ribbon optical fibers. The fibers are first positioned in the V-grooves, then glued in place after which the ends of the fibers are polished smooth with the exit surface of the positioning plate and matched with a micro lens array to provide the fiber-micro lens positioning array with sub-micron positioning accuracy.

BRIEF DESCRIPTION OF THE DRAWINGS

FIG. 1 shows a prospective view of a preferred embodiment of the present invention with alignment cameras in place.

FIGS. 1A and 1B show features of an alignment beam insertion component.

FIGS. 2A and 2B respectively show a prospective and a top view of portions of the preferred embodiment of the present invention.

FIGS. 3A, 3B and 3C show additional alignment beam features and test results.

FIGS. 6A, 6B and 6C show features of a preferred V-groove fiber-microlens positioning array.

FIGS. 9A through 9K demonstrate important lithography steps used to make one of the vertical comb drives for the MEMS mirror in the MEMS mirror array.

DETAILED DESCRIPTION OF PREFERRED EMBODIMENTS

First Preferred Embodiment

Figure 4:
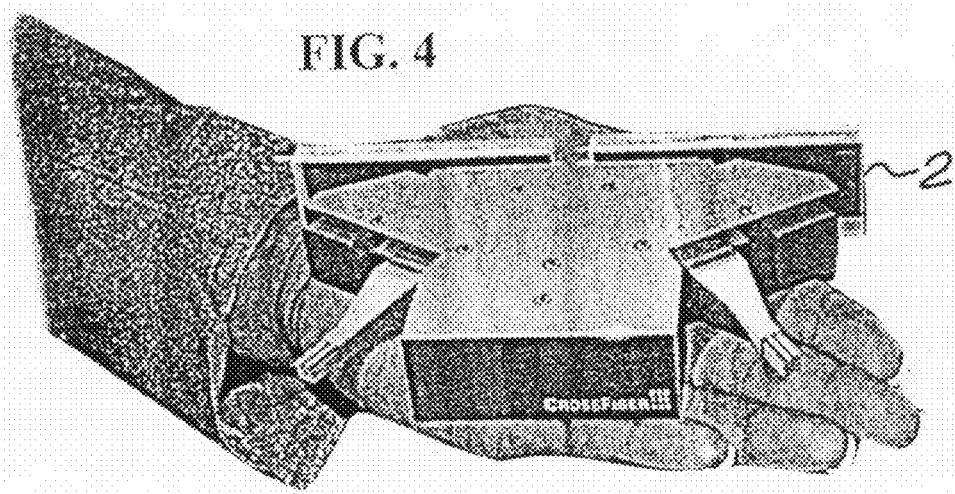
FIG. 4 shows the size of the preferred embodiment in its modular form relative to an adult human hand.

FIG. 1 shows at 2 a prospective view of features of a first preferred embodiment of the present invention. This first preferred embodiment is an optical switch module 2. Its size and general shape is described by the drawing in FIG. 4 as compared to a adult human hand. This optical switch module 2 is designed for switching optical communication beams carried by the fibers of a first 128 (8×16) optical fiber bundle such as bundle 4 as shown in FIG. 1 into the fibers of a second 128 optical fiber bundle such as bundle 6. The beams in any fiber of bundle 4 can be switched into any fiber of bundle 6. The switch is symmetrical and can be operated in either direction so that any fiber of bundle 6 can be switched into any fiber of bundle 4.

We sometimes refer to the fibers in bundle 4 as being the input fibers and the fibers in bundle 6 being the output fibers, recognizing that the switch works just as well with the fibers in bundle 6 being the input fibers and the fibers in bundle 4 being the output fibers. Also, in some cases a single fiber link could have communication beams flowing in both directions at the same time. In addition in some configurations links between fibers in bundle 4 and bundle 6 could be 4 to 6 for some fibers and 6 to 4 in other fibers. In this specification and in the claims, Application refer to the light beams carried by the optical fibers as "communication beams" primarily to distinguish them from the "alignment beams" but there may be applications of the present invention where the beams carried by the optical fibers may not be generally considered as communication beams in the normal sense because they are not specifically carrying information from one place to the other. Nevertheless, for purpose of this specification and the claims, all light beams carried by the optical fibers in bundles 4 and 6 are to be considered as communication beams.

Figure 4B:
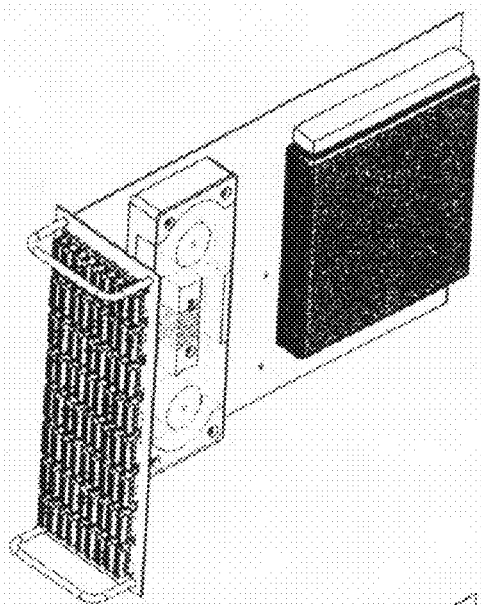
FIGS. 4A, 4B and 4C respectively show the preferred module utilized in a RODAM application, a patch panel application and a test and measurement unit.
Figure 4A:
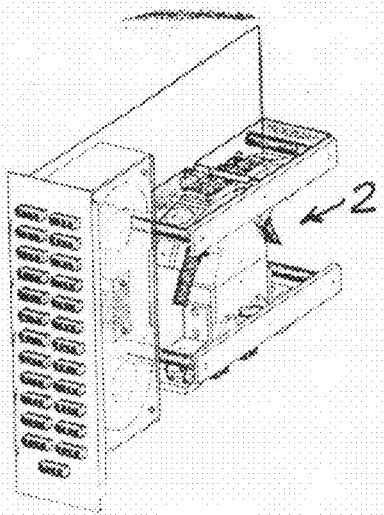
Figure 4C:
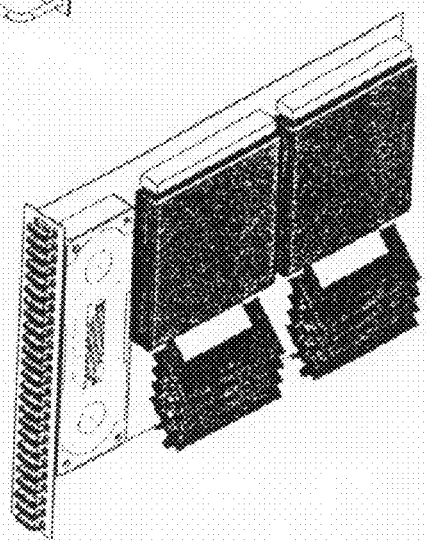

This module is designed for easy integration into a line card for insertion into a standard communication panel in a reconfigurable add-drop application as shown in FIG. 4A. The module can be utilized in a patch panel as shown in FIG. 4B and can be utilized in a large nation-wide communication system such as the one discussed in the section of this description entitled "Application in a Nation Scale Fiber Optic Network" in which each fiber is carrying information at a large number of separate frequencies. The switch is also useful as a tool for component testing and system monitoring by installation in a test and measurement panel as shown in FIG. 4C.

Important components of the preferred embodiment shown in FIGS. 1 and 2 are alignment beam units 10 and 12, dichroic beam splitter 14 and alignment screen and camera units 16 and 18 and MEMS mirror arrays 20 and 22.

Fiber-Microlens Positioning Array

The optical fibers in the first set of optical fibers are precisely positioned in a first fiber-microlens positioning array unit 8 as shown in FIGS. 2A and 2B to define a first set of parallel collimated cross-connect communication beam paths, with each collimated cross-connect communication beam path connecting an optical fiber in the first set of optical fibers with a MEMS mirror in a first MEMS mirror array. The optical fibers in the second set of optical fibers are precisely positioned in a second fiber-microlens positioning array 10 to define a second set of parallel collimated cross-connect communication beam paths, with each collimated cross-connect communication beam path connecting an optical fiber in the second set of optical fibers with a MEMS mirror in a second MEMS mirror array.

Figure 5A:
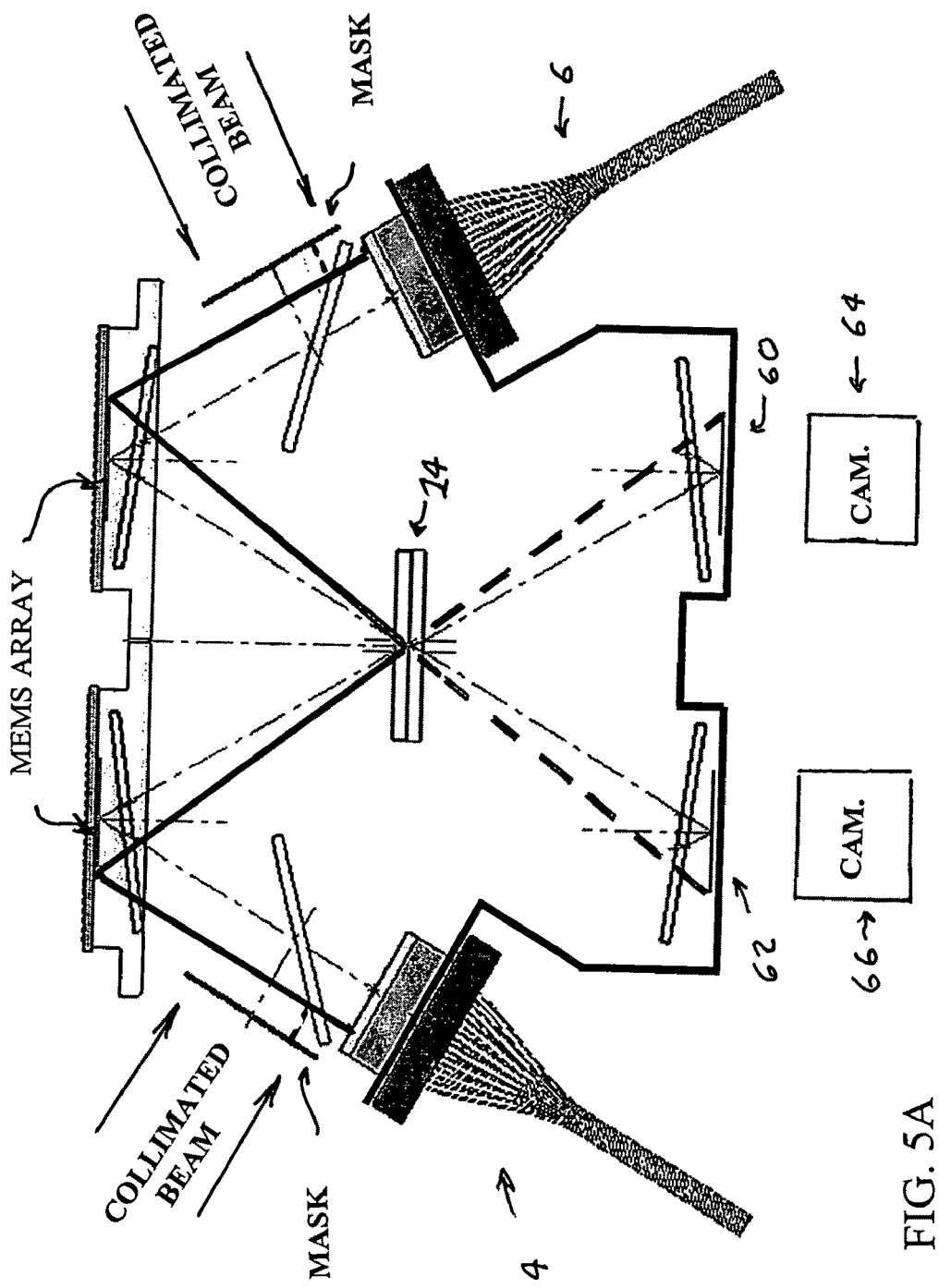
FIGS. 5A, 5B and 5C show optical paths in a preferred optical switch.
Figure 5B:
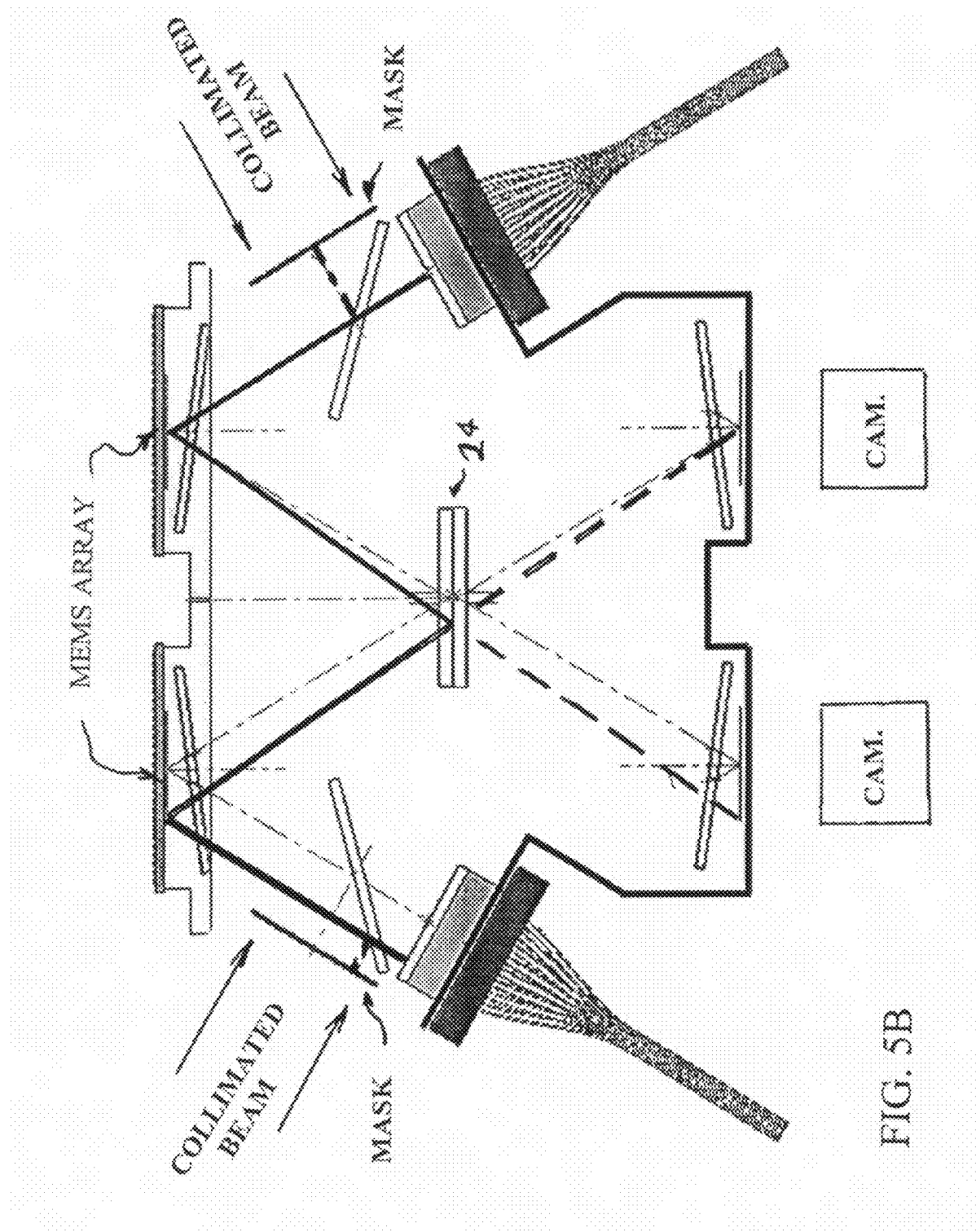
Figure 5C:
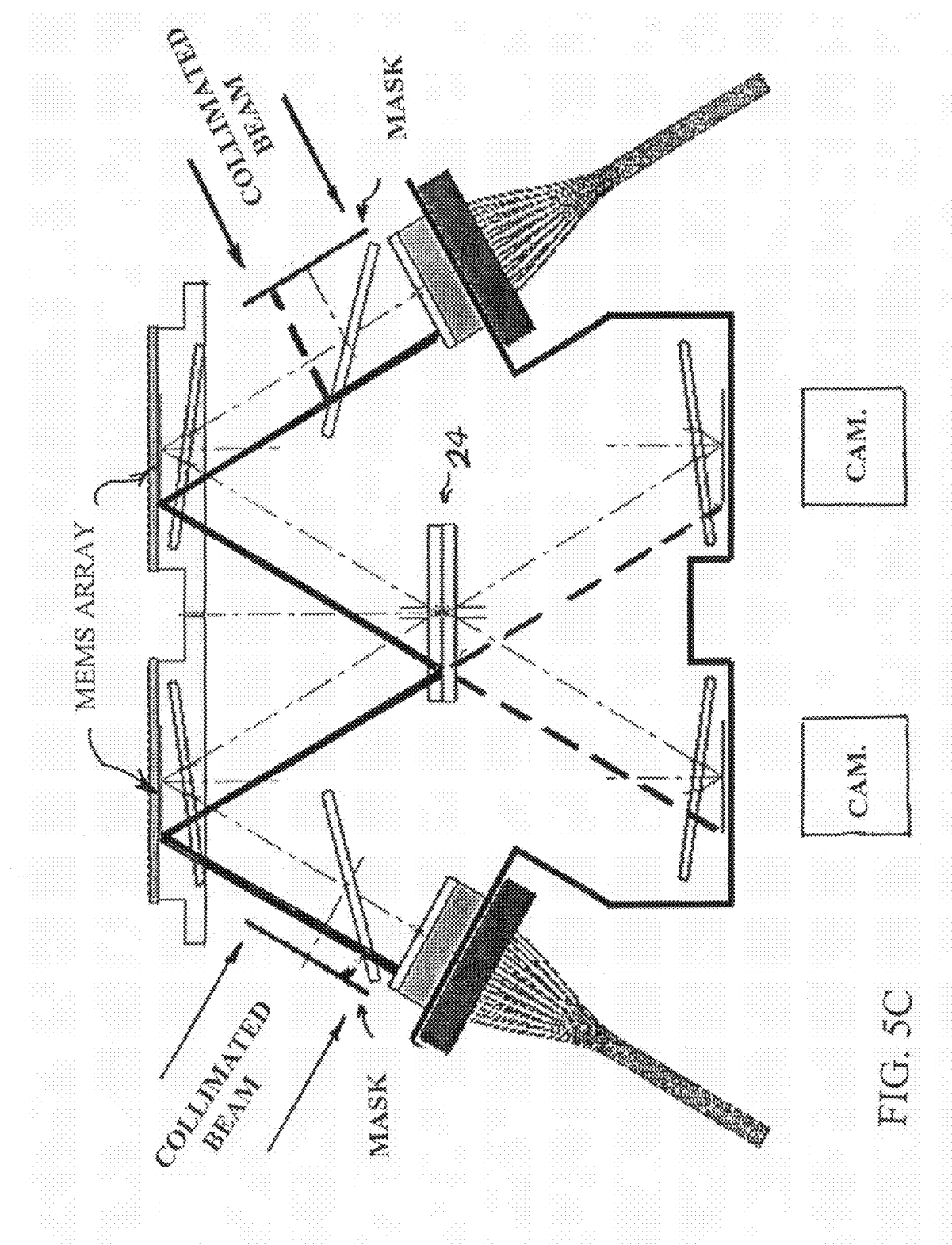
Figure 6A:
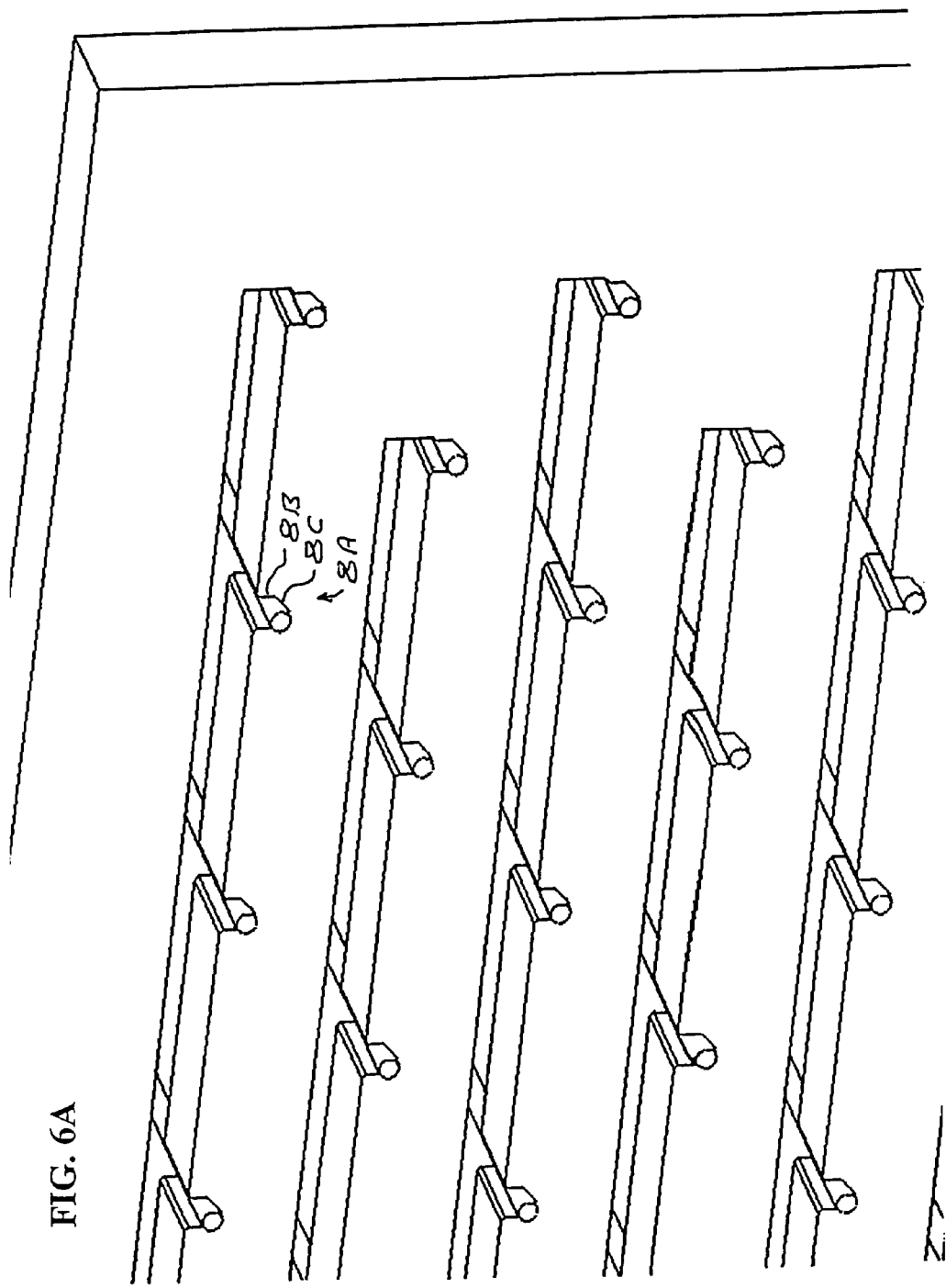
Figure 6C:
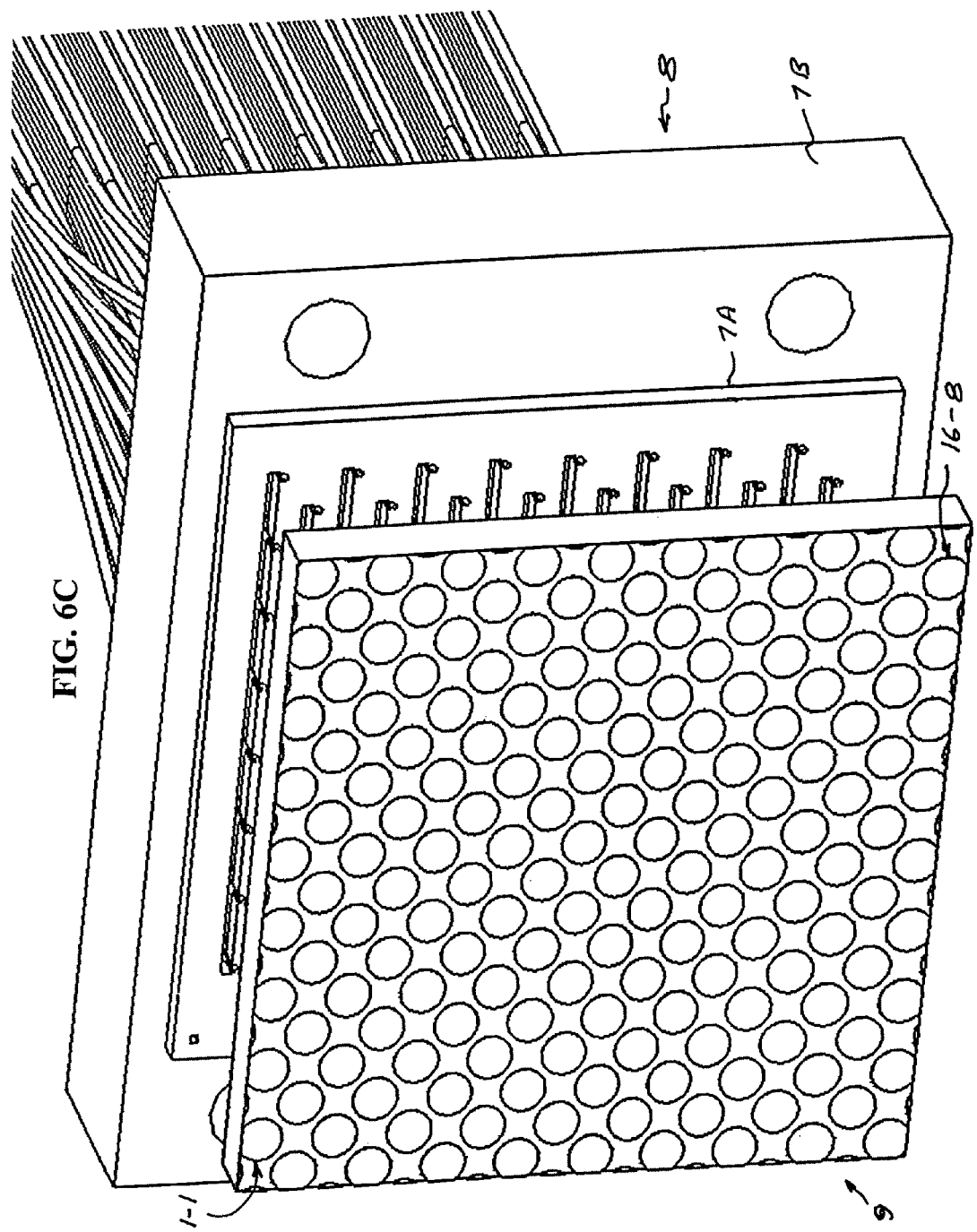

FIGS. 6A, 6B and 6C show features of a preferred fiber-microlens positioning array units. In the preferred switch each of the two fiber-microlens positioning arrays and each of the two microlens arrays define matching 8×16 matrices that Applicants have labeled 1-1 beginning at the top left as shown in FIG. 3C to 16-8 at the bottom right. Some of the corresponding matrices numbers are shown on the micro-lens drawing in FIG. 8B. These parallel collimated beam paths establish a correspondence between the first fiber-microlens positioning array and the first microlens array which are similarity labeled and a correspondence between the second fiber-microlens positioning array and the second microlens array so that each optical fiber in the first positioning array has its own corresponding microlens in the first microlens array and each optical fiber in the second positioning array has its own corresponding microlens in the second microlens array. In preferred embodiments the first and second fiber-microlens positioning array units are identical.

V-Groove Position Plate

Details of these preferred fiber-microlens positioning arrays are described in FIGS. 6A, 6B and 6C. These units are designed to easily and precisely position optical fibers in sixteen standard eight fiber ribbons with fibers having 125 micron cores. In FIG. 6B the ribbons are shown at 4A, individual fibers are shown at 4B and the bundle of fibers are shown at 4. Positioning plate 7A is comprised of a plate comprised of silicon that has been fabricated using lithographic techniques. Plate 7A is mounted on mounting plate 7B which contains mounting slots for mounting the fiber-microlens array unit in the optical switch module. Elongated horizontal slots 8 are provided for the eight fibers in each or the 16 ribbons. Precision V-groves slots 8A are cut in the bottom of elongated slots 8 These slots have 250 micron wide vertical sides 8B with a 45-degree V section 8C at the bottom of the groove, all as shown in FIG. 6A. The slots are on 2 millimeter centers in the horizontal direction and the slots are on 1 millimeter centers in the vertical direction. The V-groove slots in each row are off-set from the slots in their closest neighbor row or rows as shown in FIG. 6B, so the array cross-section dimension is 15 millimeters×15 millimeters. In these preferred embodiments the individual fibers are inserted into the slots and are precisely located in the V-grooves and glued in place. After the fibers are solidly located the ends of the fibers are cut and then the protruding and excess glue are polished away to obtain a precisely perpendicular exit surface for each fiber.

Micro-Lens Array

In these preferred embodiments an 8×16 microlens array 9, also fabricated with precision using lithographic techniques is provided with the microlens array precisely positioned to correspond to the position of the fibers in the V-grove position plate. Each lens has a diameter of about 1.1 millimeter and a focal length of 3.7 millimeter. Precision spacers not shown are used to position the microlens array so that the lenses are positioned about 3.7 mm from the ends of the fibers in the V-groove position plate. When positioning microlens array 9 the final precise location is chosen so that the waist of communication beams passing through the switch from one fiber bundle to the other is located as close as reasonably feasible to dichroic mirror 24 as shown in FIG. 1 and FIGS. 5A, 5B and 5C.

Co-Axial Alignment Beams

Preferred embodiments of the present invention include provisions for providing alignment beams aligned co-axially with each of the beams exiting each fiber in both of the fiber bundles 4 and 16. A particular technique for providing these alignment beams is shown in FIGS. 1, 1A and 1B alignment techniques are described by reference to FIGS. 5A, 5B and 5C. As shown in FIG. 1 this preferred embodiment includes alignment unit 10 for aligning communication beams from fiber bundle 4 and alignment unit 12 for aligning communication beams from fiber bundle 6. Alignment unit 12 is also shown in FIG. 1A and a cut away drawing of it is shown in FIG. 1B. Unit 12 includes an injection unit 12A with a "point" visible light source shown at 12F such as a vertical cavity surface emitting laser (VCSEL) operating in the near infrared at 850 nm and having a divergence of about 30 degrees. The beam from this source is collimated with collimator optics 12A to produce a collimated beam with a cross sectional dimension of about 16 millimeter×16 millimeters. This collimated beam is separated into 128 separate beams with mask 12C having 128 0.6 mm diameter apertures that are positioned to align the 128 separate parallel beams with the communication beams from fiber bundle 6. The actual alignment occurs at dichroic beam splitter 12D that passes the communication beam and reflects the alignment beams.

MEMS Mirror Beam Control

Figure 8A:
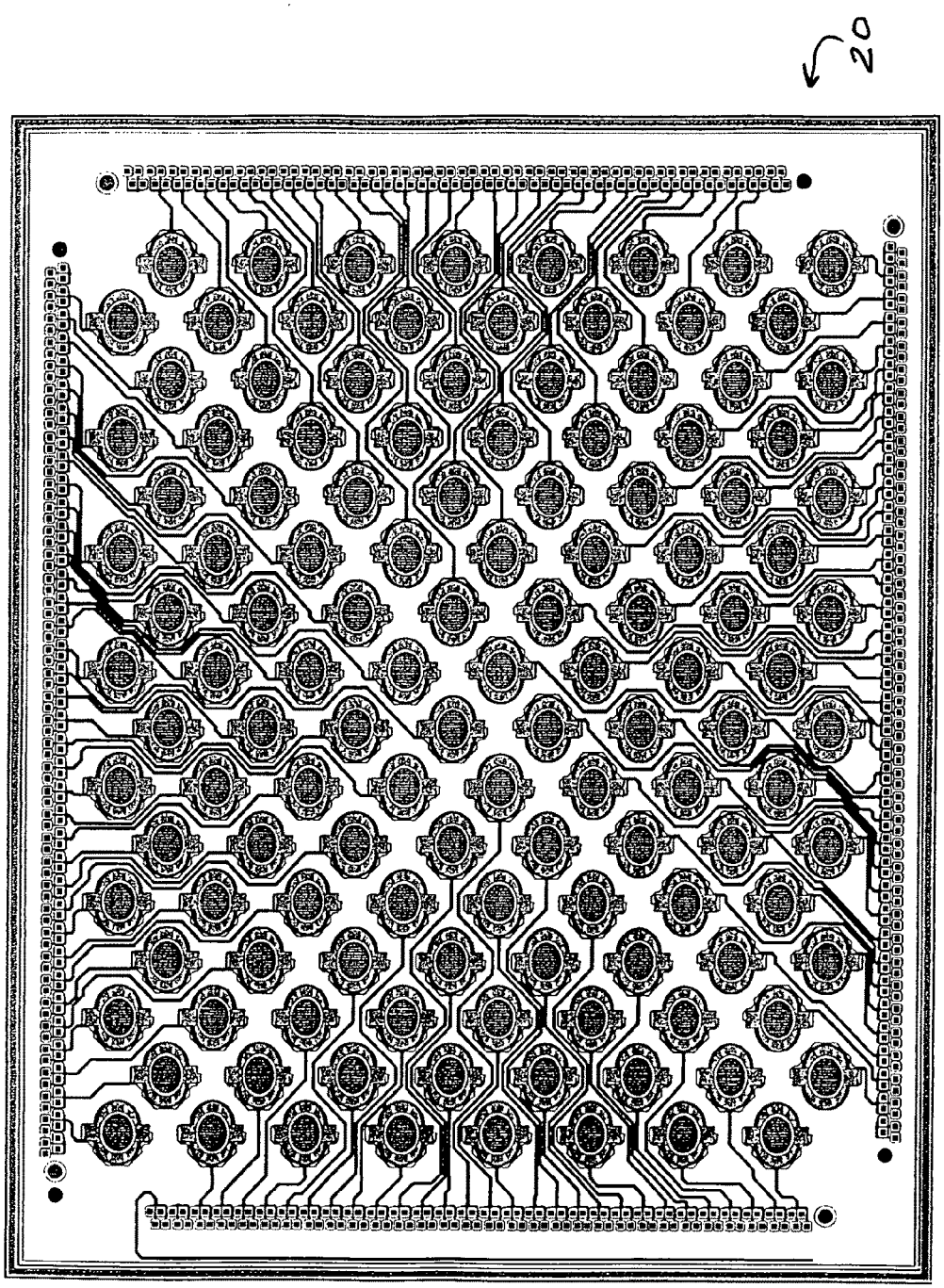
FIG. 8A shows a MEMS mirror array designed by applicants.
Figure 8B:
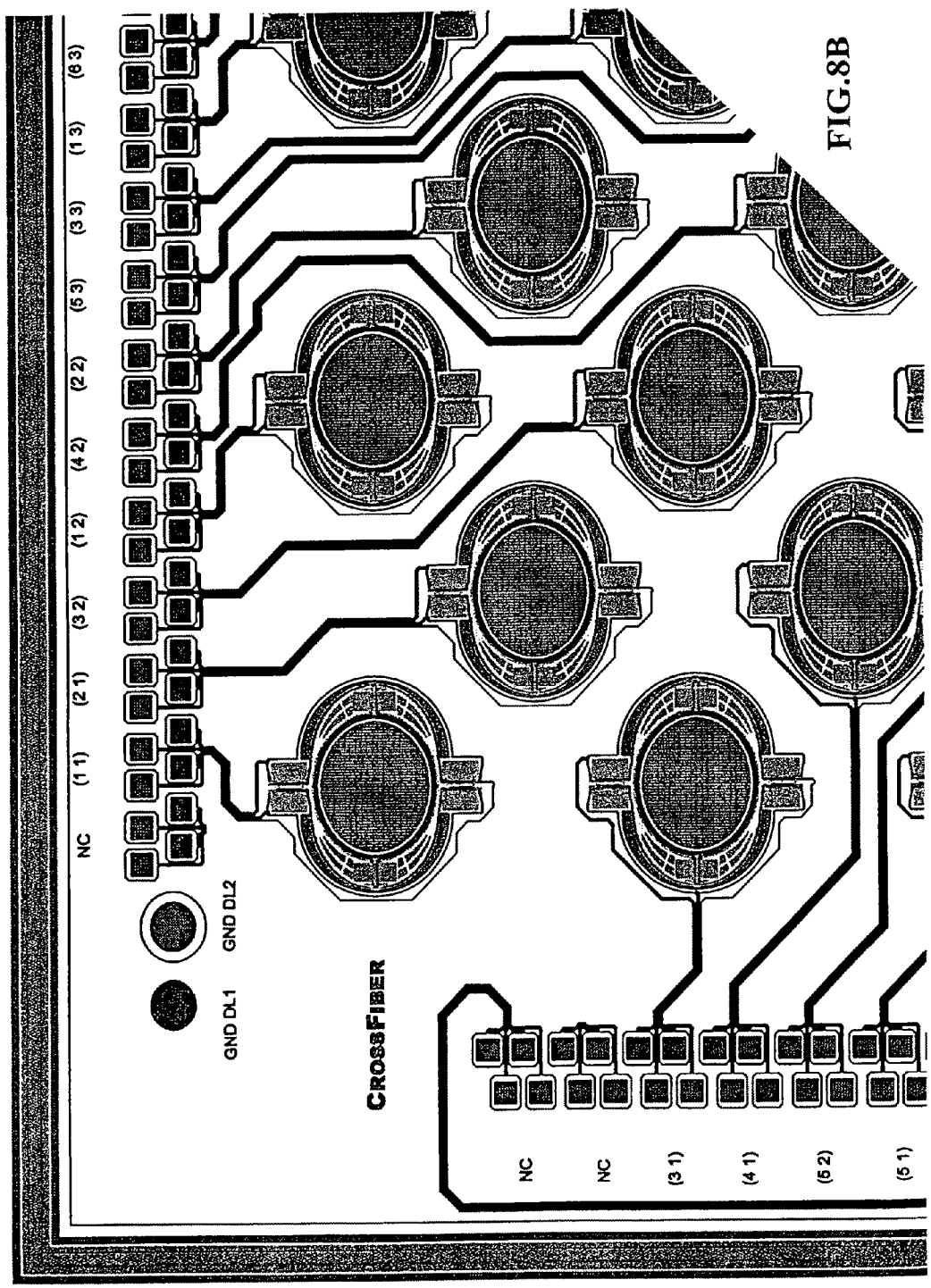
FIGS. 8B, 8C and 8D show magnified portions of the MEMS mirror array.
Figure 8C:
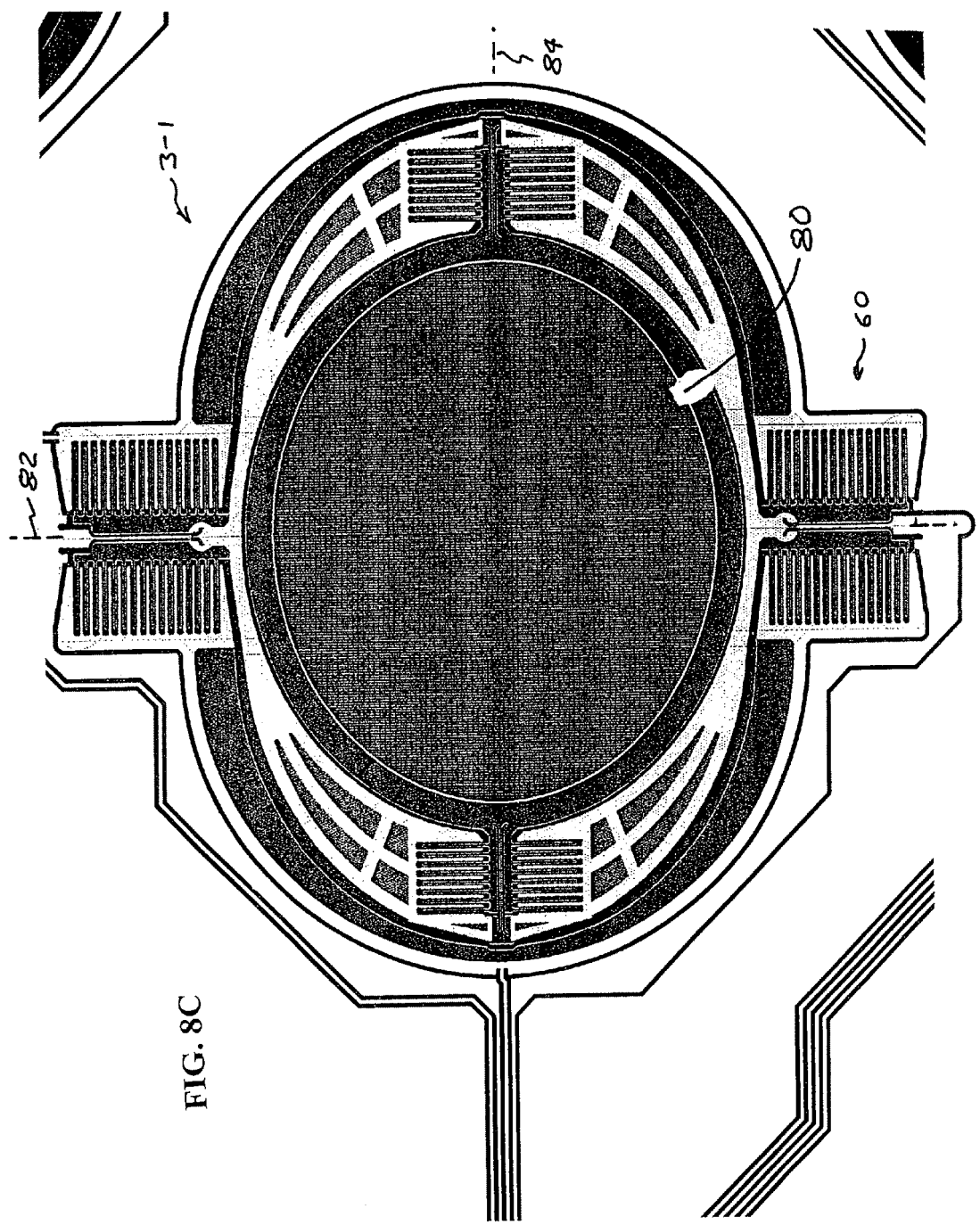
Figure 8D:
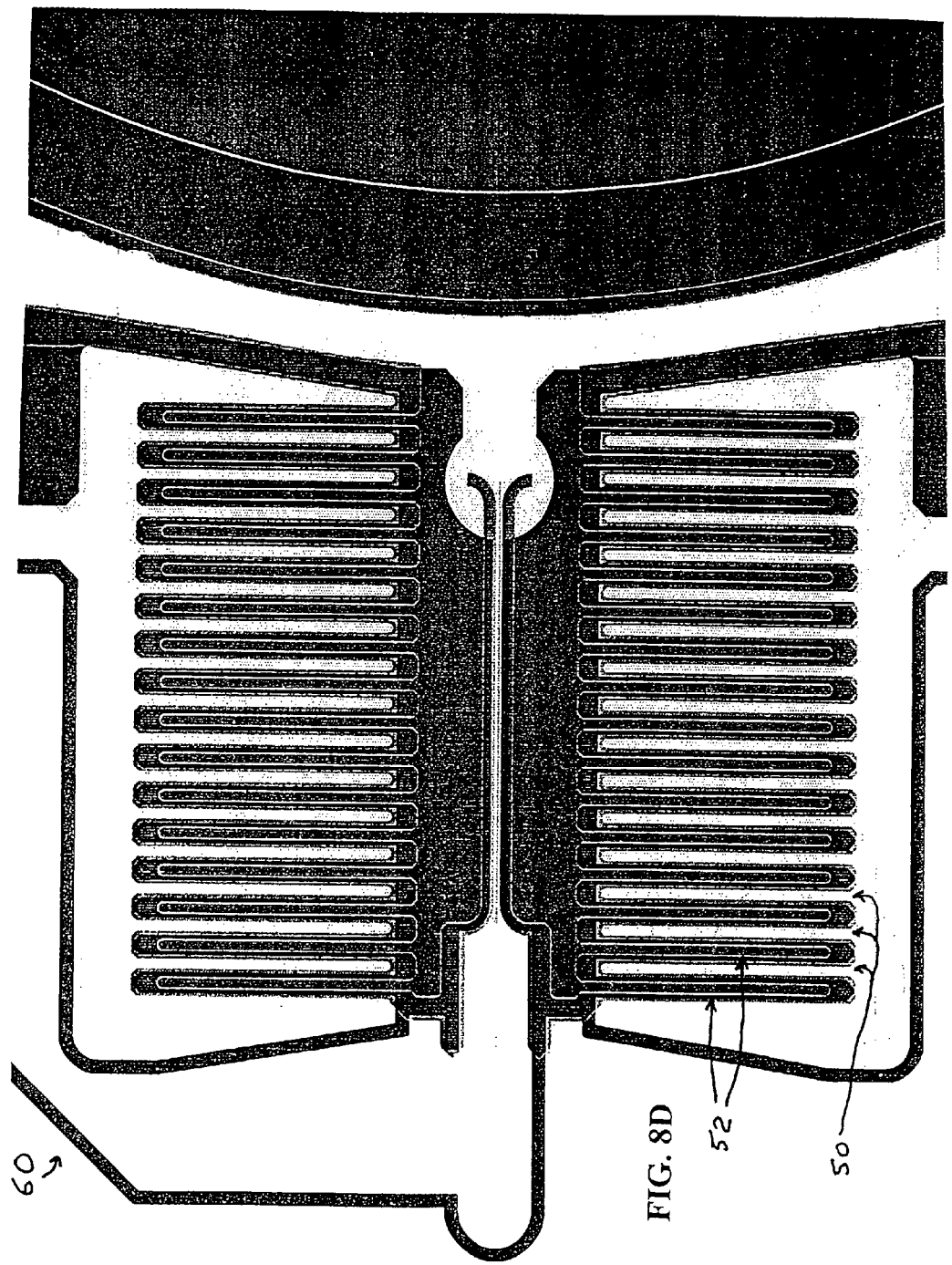

In preferred embodiments communication beams are directed within the switch module with two MEMS mirror arrays 20 and 22. The two arrays are identical. MEMS mirror array 20 is shown in FIG. 8A. The position of the mirrors correspond precisely to the positions of the fibers and the microlenses in fiber-microlens array unit 8 and 10. An expanded drawing of the top left corner of FIG. 8A is shown in FIG. 8B and a further expanded drawing of one of the mirrors (mirror 3-1) is shown in FIG. 8C. FIG. 8D shows an even further expansion of one of the vertical comb drives, drive 60, of one of the FIG. 8C mirrors. Techniques for producing MEMS mirrors are well known and well reported in the prior art. The MEMS mirrors of the present invention include special features adapted to produce the excellent performance of preferred embodiments of the present invention. As shown in FIG. 8C a gold reflecting surface 80 of each MEMS mirror can be pivoted about two axes, a first axis 82 about which pivots inner frame 84 and a second axis 86 about which reflecting surface 80 pivots. Comb fingers attached to the axes are positioned below "stationary" fingers (shown white in FIGS. 8A, 8B and 8C) attached to the frames. Electrical potentials of 0 to 200 volts causes the lower fingers to be pulled up between the "stationary" fingers causing the mirror surface to pivot about it respective axes.

Fabrication Techniques for Comb Drives

A special preferred technique for producing the comb drives for the MEMS mirrors shown in the figures is described with respect to FIGS. 9A through 9K. As indicated in FIG. 9A the process starts with a wafer of two 25 micron thick layers 30 and 32 of single crystal silicon on a 380 micron thick single crystal silicon handle layer 34. The three layers of silicon are separated by a 1.5 micron buried oxide insulator 36 and a 0.5 micron buried oxide insulator layers 38. The silicon layers are all doped to reduce their electrical resistivity to the range of about 10 to 20 milli-ohm centimeters. A SiO2 layer 40 is added as shown in FIG. 9B which is patterned using photo resist and a contact mask to produce the pattern 42 shown in FIG. 9C. Next as shown in FIG. 9D a resist mask 44 is applied covering part of oxide pattern 42 as shown in 9D. This modification of mask pattern 42 is a very important step since it and some following steps will assure that the extremely thin comb elements in this comb drive will be properly aligned. For as shown in FIG. 9E, the mask laid on in FIG. 9D is used to etch away part of the oxide pattern laid down in the FIG. 9C step. Next as shown in FIG. 9F a deep reactive ion etch is used to etch silicon layer 30 using the same mask pattern 44. After this etching step has completely removed the silicon between the wafer surface and oxide layer 36 the photo resist applied in the FIG. 9D step is removed as shown in FIG. 9G. A blanket oxide etch is applied to remove all exposed buried oxide while leaving enough of the modified mask 42 to protect the silicon beneath it form the subsequent silicon etching step shown in FIG. 9J. Next backside etches are applied to remove most of handle 34 and oxide layer 38 under silicon layer 32 as shown in FIG. 9I. Then as shown in FIG. 9J the wafer is temporally mounted on a handle wafer and the unprotected portions of silicon layers 30 and 32 are etched away. And an oxide etch is applied to remove the oxide layers form the tops of the comb fingers to leave the comb fingers as shown in FIG. 9K. The tall fingers 50 are a part of the frame of the MEMS mirror and will be a fixed part of the MEMS frame or the central frame element of the MEMS mirror. The short fingers will be move with the mirror element as potential is applied as discussed later. The tall fingers are shown in white in FIG. 8D at 50 and the short moving fingers are shown in black at 52 in FIG. 8D outlined in a thin white line. These are the fingers that rotate with the gold mirror surface 80 of the MEMS mirror as shown in FIG. 8C.

The reader should note that the tall fingers 50 are divided into two conductive silicon parts 47 and 43 by insulating layer 45. During control of the MEMS mirrors electrical potentials of between 0 and 200 volts are applied between silicon parts 47 of the tall "stationary" fingers and the short moving fingers 52. This produces an attractive electrical force pulling moving fingers 52 up in between silicon parts 47 of the tall "stationary" fingers in order to tilt the reflecting mirror surface.

Control of MEMS Mirrors

Figure 7:
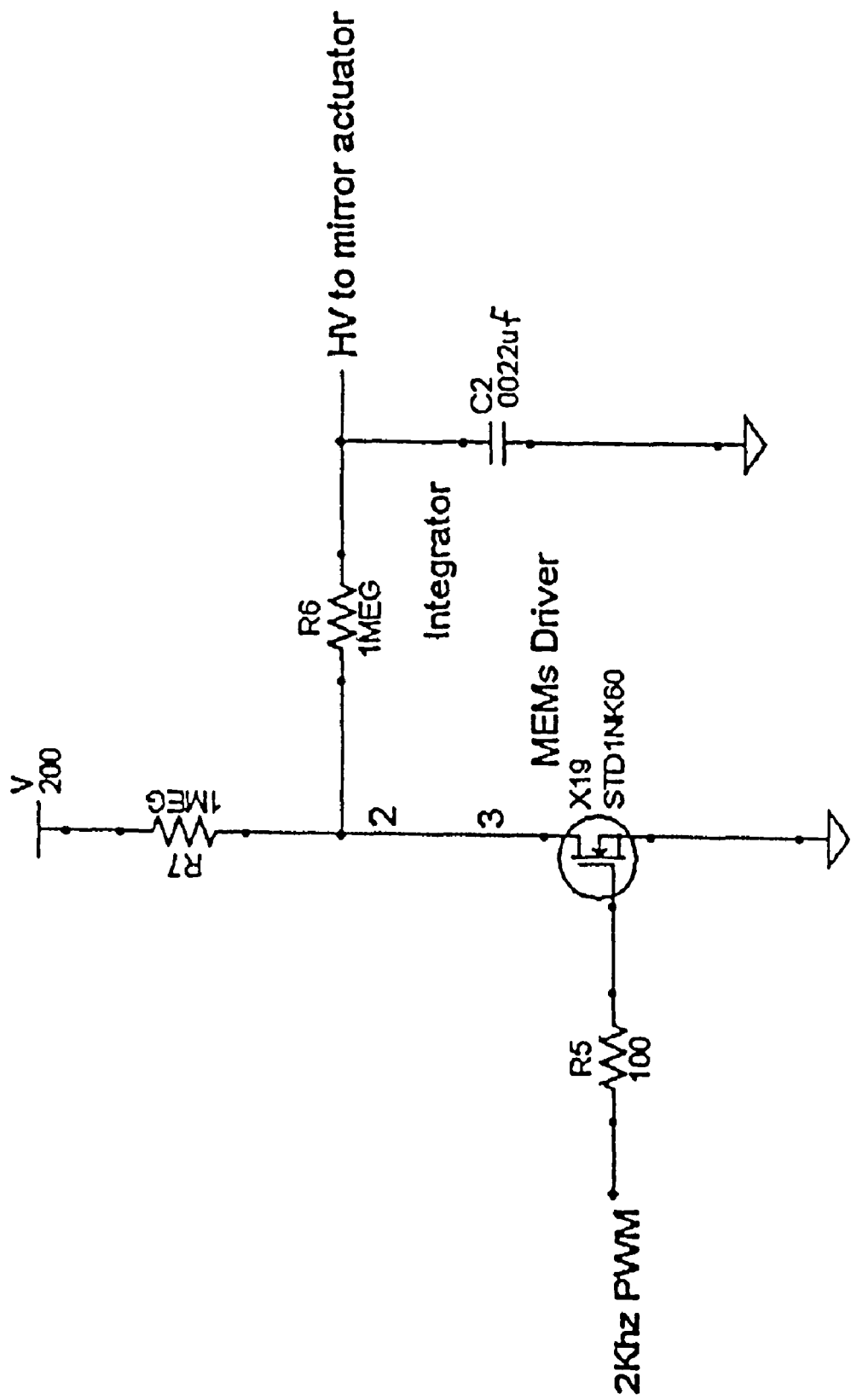
FIG. 7 shows a MEMS driver control circuit.

A preferred circuit for controlling the MEMS mirrors is shown in FIG. 7. Two circuits are needed for each comb drive unit. There are two comb drive units for each of the two axes for each of the 128 mirrors. So this embodiment requires 1024 circuits to control the 128 mirrors. The good news is that the components of the circuits shown in FIG. 7 are very inexpensive, only a few cents for all of the components. The circuit is provided with a 200 volt bias as shown in the figure. This 200 volt bias charges capacitor C2 only when transistor X19 is in an "off" state. When transistor X19 is "on" there is a discharge path between capacitor C2 and the ground node. Transistor X19 is turned on and off with two kilohertz pulse width modulator indicated on the drawing as "2 Khz PWM" which in turn is controlled (in Applicants' prototype unit) by a field programmable gate array or a programmable logic device (both not shown). The electric potential on capacitor C2 determines the position of one of the comb drives of one of the MEMS mirrors. The potential can be any potential between 0 volts and 200 volts. The potential on capacitor 2C depends on the modulation of the 2 Khz pulse width modulator shown in FIG. 7. If the width of each of the 2,000 pulses per second is maximum, transistor X19 will be "on" continuously and the voltage on C2 will be approximately zero. If the width of each of the 2,000 pulses per second is minimum, transistor X19 will be "off" continuously and the voltage on C2 will be approximately 200 volts. The pulse width can be varied between minimum and maximum to vary the voltage potential on capacitor C2 from 200 volts to zero volts. The tilt of MEMS mirrors such as MEMS mirror 3-1 depends on the voltage applied to the four vertical comb drive units controlling the position of each mirror.

Each of the MEMS mirrors has sufficient range to direct beams as needed to connect any of the fibers in bundle 4 to any of the fibers in bundle 6.

Beam Direction Sensors

In preferred embodiments the MEMS control system includes a first beam direction sensor unit 16 as shown in FIG. 1 positioned to detect each alignment beam in the first set of alignment beams transmitted from injection unit 10 co-aligned with communication beams from fiber bundle 4, reflected from MEMS mirror array unit 20 and transmitted through the dichroic mirror 14. The embodiment also includes a second beam direction sensor unit 18 positioned to detect each alignment beam in the second set of alignment beams transmitted from injection unit 12 co-aligned with communication beams from fiber bundle 6 and transmitted through the dichroic mirror 14. In a particular preferred embodiment each of the beam direction sensor units each includes an alignment beam detection screen 60 and 62 and a video camera 64 and 66 for viewing the position of the intersections of the alignment beams with the unit's viewing screen. The screen can be any of a wide variety of screens that produce an image when illuminated with an alignment beam. FIG. 3B shows test results produced with a variety of screen candidates. Results are plotted as a function of mirror angle. FIG. 3A shows a typical illumination pattern viewed from the side of the screen opposite the beam intersection side. These include frosted glass and various diffusers. A preferred screen is a holographic diffusers supplied by Luminit with offices in Torrence, Calif. FIG. 3 provides an illustration of the beam direction sensor system. The reader should note that the screen in this preferred embodiment will be adapted to detect 128 beams with an 8×16 pattern corresponding to the mirror arrays 20 and 22 and the fiber-microlens arrays 8 and 10.

In these embodiments the MEMS control system includes a processor programmed to provide a closed loop adjustments of pairs of MEMS mirrors (one from each of the two MEMS mirror array) in order to determine appropriate voltage potentials to be applied to the comb drive actuators in order to provide each desired optical path between the two sets of optical fibers. Applicants' tests have shown that once the calibration has been performed there is very little drift in the beam paths under normal conditions. However, significant changes in environmental conditions could require a recalibration. In some embodiments the switch could be adapted to automatically re-calibrate itself periodically or at the direction of operating personnel.

Directing the Beams

FIGS. 5A, 5B and 5C show some simple illustrations of the operation of the preferred embodiment described in detail above. FIG. 5A illustrates the connection of a fiber column 1 of bundle 1 with a fiber in column 8 of bundle 6. The reader should note that camera 64 and 66 detect the co-aligned alignment beams passing through dichroic mirror 24 to provide feedback to the MEMS mirror control to adjust positions of the MEMS mirrors to assure that the beam path is the correct one. FIG. 5B demonstrates a connection between the same input fiber and a fiber in one of the columns near the center of the fiber-microlens array and FIG. 5C demonstrates a connection between the same input fiber and a fiber in column 1 of the fiber-microlens array. The reader should not the position of the alignment beam in FIGS. 5B and 5C.

Application in a Nation Scale Fiber Optic Network

U.S. patent application Ser. No. 10/677,590 that has been incorporated herein by reference describes a nation-scale high speed communication network that utilizes all optical switches. The switches described herein would work very well in a network like the ones described in that application. In the preferred embodiment described in the '590 application, the center wavelength of the beams in each fibers is about 1.57 micron (corresponding to 193.1 THz) with a usable bandwidth of 15,000 GHz (between 186,000 GHz to 201,000 GHz). As many as 300 separate communication channels (at 50 GHz each) may be carried in the beam in each fiber. Each of the 300 separate channels (at 50 GHz each) can be divided up into still smaller frequency ranges such as six sub-frequency ranges with 4 GHz spacings. This would permit 1200 signals to be transmitted simultaneously in each fiber, so with 256 fibers per bundle, we could theoretically transmit more than 300,000 separate signals simultaneously per fiber bundle. These signals must be inputted separately at transmit locations to produce the combined beams and separated out from all other signals to be received by each signal recipient. This is referred to as frequency division multiplexing Time division multiplexing permits additional multiplication of the number of separate communications that can be handled during any particular time period.

Figure 11:
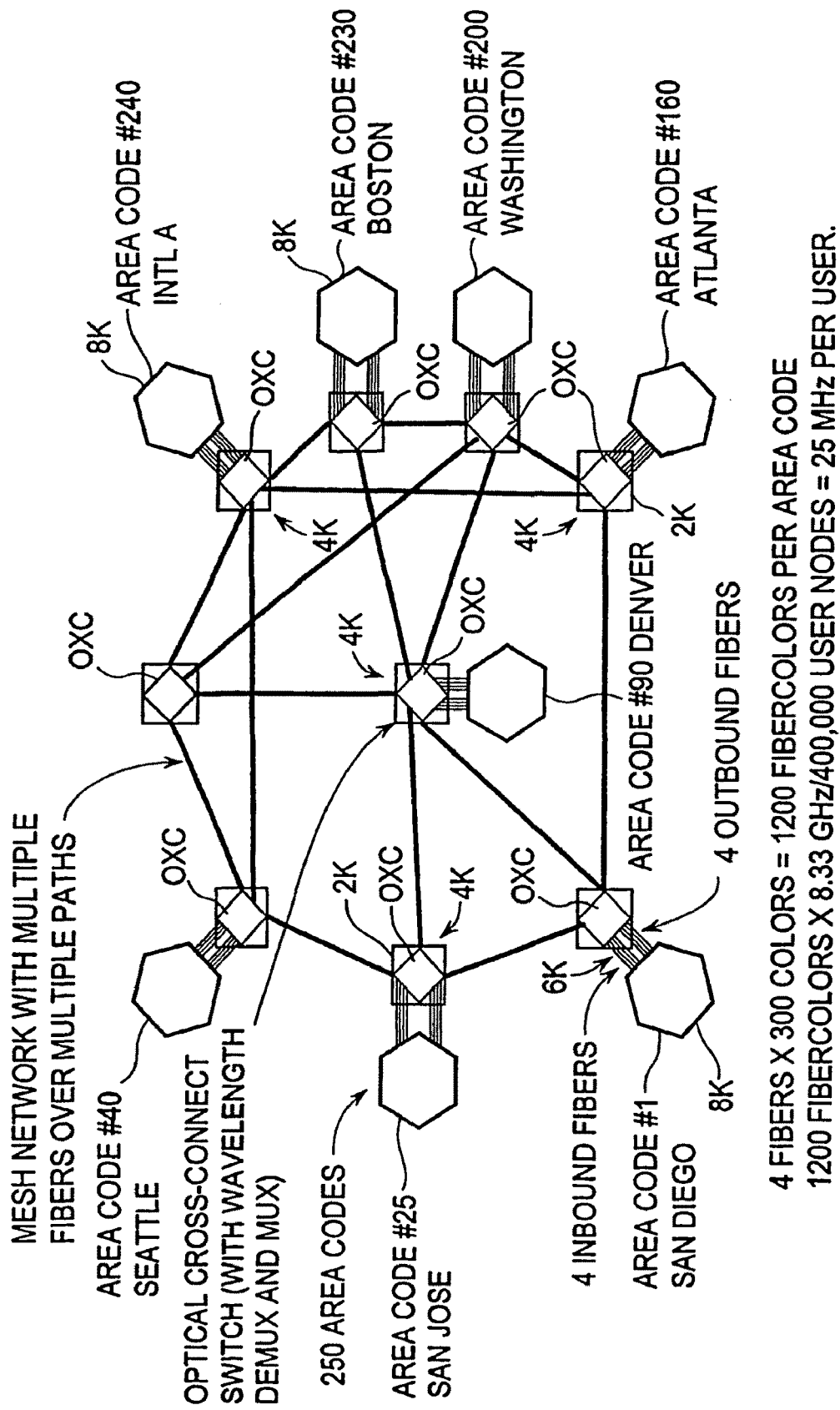
FIG. 11 shows a nationwide fiber optic network.

FIG. 11 is a modified version of FIG. 1 from the '590 patent application. Here we consider a nation-scale network with end users assigned to one of 250 area codes with roughly equal numbers of end users in each. For instance, area code #1 has been assigned to San Diego, #40 to Seattle, #200 to Washington D.C., and #240 to some subset of international users. The proposed network can have about 400,000 User Nodes per Area Code. As seen in FIG. 1, optical cross-connect switches 2K associated with each area code are located at mesh nodes 4K tied together in a mesh network which allows switching of optical signals from any particular area code to any other area code. The particular mesh network would make maximum use of intercity fiber trunk lines which have already been installed.

In this preferred embodiment all long haul communication is through optical fibers operating in the wavelength range centered at about 1.57 micron (corresponding to about 193.1 THz). The network is designed to operate at frequencies between 186 THz to 201 THz for a total bandwidth of 15,000 GHz. At 50 GHz spacings, this provides 300 "color" channels per optical fiber. Four separate fibers provide a total of 1200 communication channels.

There are in this embodiment 1200 separate wideband communications channels (each with 15 GHz of useable optical bandwidth) leaving and entering each area code. We call these wideband channels FiberColors, and they are distributed as 300 different DWDM wavelengths (standard 50 GHz spacing) on 4 separate fibers. The preferred optical network operates in the C and L bands at a center frequency at 1570 nm (193.1 THz). Thus there are eight lit fibers between an Area Code and its corresponding switch, four for outgoing traffic and four for incoming traffic as shown at 6K on FIG. 11.

If we divide 1200 FiberColors by the number of area codes (300) we have an average of 4.8 FiberColors per area code. However, the 1200 outgoing FiberColors from any particular area code (say San Diego) are allocated based on usage demand to the 250 area codes with a total bandwidth of .about.15 THz per fiber. For instance, the FiberColors for traffic from San Diego might be allocated at a particular time as follows: ten for traffic to Washington, six for traffic to Seattle, one for traffic to Atlanta, etc., until all 1200 FiberColors are accounted for. It is expected that the actual allocation will be automatically adjusted periodically as demand shifts with time of day and day of the week. Therefore, at any particular time, the switches must be configured so that each FiberColor from each origination area code is guided through the network to its destination area code without interference. (That is, the same fiber cannot be used simultaneously for two FiberColors operating at the same wavelength). It was not immediately obvious that this could be done, but applicants have developed an algorithm for accomplishing this task which appears to be robust and to converge in a practically short time. We call this algorithm a Magic Square Algorithm, because the underlying matrices of FiberColors which need to be allocated have rows and columns which add up to the same number. This problem of allocating FiberColors along with its solution is discussed in detail in the section of this specification entitled "Magic Square Software." The solution of this problem is a key technical innovation, as it enables the deployment of a nation-scale all-optical network with a relatively small number of channels without the disadvantages of having to convert any optical signal to an electrical signal or to another DWDM wavelength between the data source and the data destination area codes.

Operation of the switches 2K at the Mesh Nodes 4K is discussed in more detail in the '509 patent application." In preferred embodiments, all DWDM wavelengths are de-multiplexed before optical switching, and then re-multiplexed after switching. No wavelength separation is required at a resolution finer than the standard 50 GHz DWDM spacing, so that standard components can be used. (Finer channel resolution only occurs within the source and destination area codes). Customized switches which combine wavelength separation with the optical switching may also be possible. Optical Amplifiers (such as erbium doped fiber amplifiers) are used throughout the network as necessary to maintain appropriate optical signal strength.

Other Control Techniques

Figure 10:
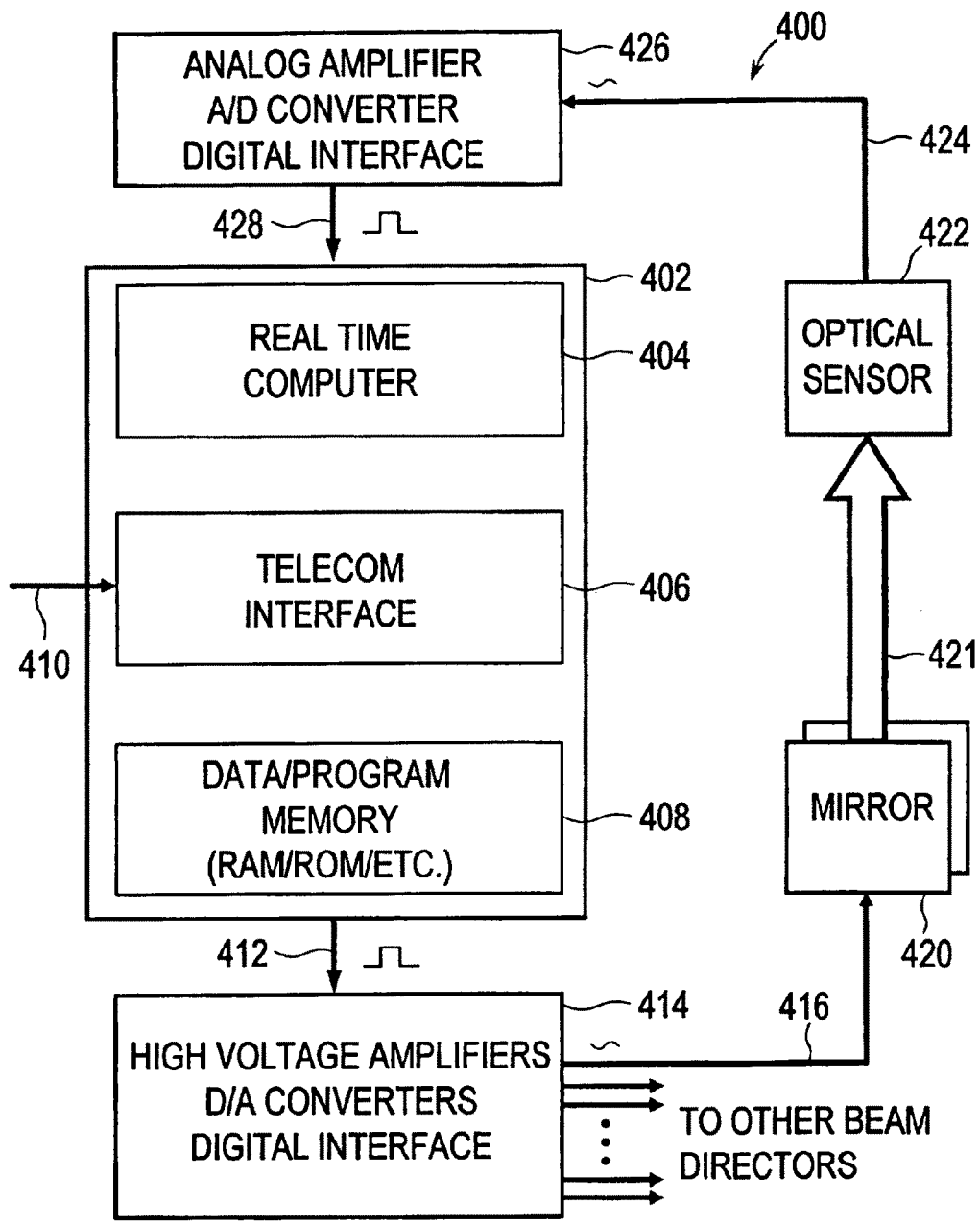
FIG. 10 shows a control system.

Referring now to FIG. 10, a block diagram of the control system of the Optical Cross Connect Switch of the present invention is shown and generally designated 400. Control system 400 includes a computer 402 containing a real time computer 404, a telecommunications interface 406, and a digital storage device 408. Computer 402 is a system capable of making the computations required to implement a closed-loop feedback control system. It may be comprised of analog or digital electronics, or may be implemented with optical computations units. In a preferred embodiment, the computer consists of digital electronics with at least one component capable of computation, and with at least three digital interfaces. The first interface would be capable of receiving the digitized optical feedback signals, the second interface would be capable of transmitting command signals to the analog electronic driver required for actuation of beam directors 16 and 18. And the third interface would be capable of receiving the network configuration command from an external source and transmitting the state of the optical switch. Other interfaces may be required for certain implementations.

In a preferred embodiment, the digital computation electronics could consist of one or more general purpose processors, such as a commercial available digital signal processor or other central processing unit, or might be one or more application specific integrated circuits design specifically for this task. The digital interfaces could consist of any one of a large variety of parallel or serial links and may conform to some industry standards, or may be custom for a particular implementation.

Telecommunication interface 406 provides an electronic interface between computer 402 and a telecommunication exchange via interconnect 410. In a typical environment incorporating the switch of the present invention, interconnect 410 will receive switching information, including the input fibers and the output fibers, which are to be optically coupled. A standard format for receiving this information may be established by a particular telecommunications network, but it is to be appreciated that regardless of the particular protocol, this information will contain particular switch configurations which may be implemented by the present invention.

Digital storage device 408 may include both temporary and permanent digital memory media. For example, digital storage device 408 may include random access memory for manipulation of data, and programmable read only memory for storage of programmed computer sequence steps, and may include tables of offset values.

Computer 402 is electrically connected to digital interface 414 via electrical connection 412. Digital interface 414 contains high voltage amplifiers, and digital to analog converters that convert digital information from computer 402 to the analog signals necessary to control the mirror elements. Digital interface 414 also transmits and receives any necessary digital data between computer 402 and beam directors 420. (The reader should not that for simplicity FIG. 8 shows only one mirror and one sensor and should recognize that each cross connection beam is controlled by the positioning of two mirrors and beam directions are monitored by two sensors. However, a preferred technique for maintaining beam position is to adjust only one mirror at a time. It will often be necessary to tweak one mirror in a beam path then tweak the other one several times before perfect control is established. This can all be programmed to occur automatically or as directed by an outside control device or operator.

The pivot controls for a single MEMS mirror receive the electronic signals from interface 414 and drive the MEMS mirror its two particular rotational positions in order to direct cross-connect beam in its desired directions. In order to ensure that the MEMS mirrors are properly positioned, the optical sensors measure the position of the alignment beam and provide optical feedback as described above. Analog interface 426 contains analog signal conditioning components, including analog amplifiers and analog to digital converters, which receive the analog signals from optical sensor 422 and generate digital signals for transmission along electrical connection 428 to computer 402. Computer 402 receives the electronic information from sensor 422 regarding the position of the alignment beam, and compares this position to the position contained in the memory 408 to determine whether the beam director elements 420 in beam directors 16 and 18 are properly positioned. If there is a difference between the position of the alignment beam measured by sensor 422 and the position data contained in memory 408, computer 402 adjusts the electronic signals sent to digital interface 414 to modify the rotational position of beam director elements 420 and re-position the alignment beam within the sensor. The position of the alignment beam is then once again measured by optical sensor 422, and the adjustment to the rotational positions of the beam directing elements is repeated if necessary. By properly positioning the alignment beam in this manner, the proper position of the communication beam is achieved without any interference with or measurement of the communication beam itself.

Example of Operation of the Invention

In operation, the preferred switch of the present invention transmits an optical signal from an input fiber in bundle 4 to an output fiber in bundle 6. The operation of a preferred embodiment of the present invention is perhaps best understood with reference to FIGS. 1A and 1B.

Reconfiguration of the input-output mapping of fibers, the switch fabric, is accomplished as follows. Upon receipt of a reconfiguration command, the beam steering mirrors of the affected channels immediately perform an open loop step, moving from their current position to a new position appropriate for completing the commanded reconfiguration. During the open loop step, control feedback is terminated on the affected channels. When the beam steering elements are near their new positions, the alignment beam falls on the portion of the sensor correspond to the new output fiber indicated by the configuration command. At this point, closed loop servo control is re-initiated and the new connection is finalized. During the open loop step, the alignment beam for all the other repositioning channels may be switched off in order to eliminate any contamination of the servo feedback signal of non-switched channels by the guidance beams of the switching channels.

In a preferred embodiment, the servo loop may operate only on the mirror elements in the second mirror array. In alternative embodiments, the servo loop may operate on the mirror elements in the first mirror array, the second mirror array, or both the first and second mirror arrays. In one embodiment, the calibration of each of the mirror elements in the first array is sufficiently accurate that it is possible to position these elements with an open loop signal such that substantially all of the optical energy of the alignment and communications beams corresponding to each element will fall on the intended target mirror element in the second beam director array. The open loop pointing of the beam directing mirror elements is calibrated at manufacture, and periodically throughout the lifetime of the device, insuring that the open loop pointing accuracy is high. Also, the open loop pointing accuracy of the mirrors in the first array needs to be no better than a few percent of the full stroke since small errors in position of the first elements are, in effect compensated by the closed loop servo control system operating on elements in the second mirror array. This initial open loop pointing, in combination of the feedback control of the second beam directing elements accurately positions the communication beam onto the center of the output fiber.

Multiplexing and De-Multiplexing

An important application of the switch described above is as a part of a frequency multiplexing or de-multiplexing operations. As explained above multiplexing typically involves adding signals at specific frequencies to a trunk line optical fiber carrying other frequencies and de-multiplexing is the opposite. In each case switches are needed to direct the resulting optical signals into the desired direction, typically separate optical fibers. Several multiplexing and de-multiplexing techniques are available as discussed in the background section including the use of thin film filters. However, Applicants preferred multiplexing/de-multiplexing technique is one that they have developed that provides substantial advantages over prior art techniques. This technique utilizes porous silicon optical filters. This technique produces results very similar to thin film filters, but the porous silicon filters can be produced much quicker and with much less expense. A short summary description of these porous silicon optical filters is provides below and pictured in FIGS. 12A and 12B.

Porous Silicon Optical Filters

Figure 12A:
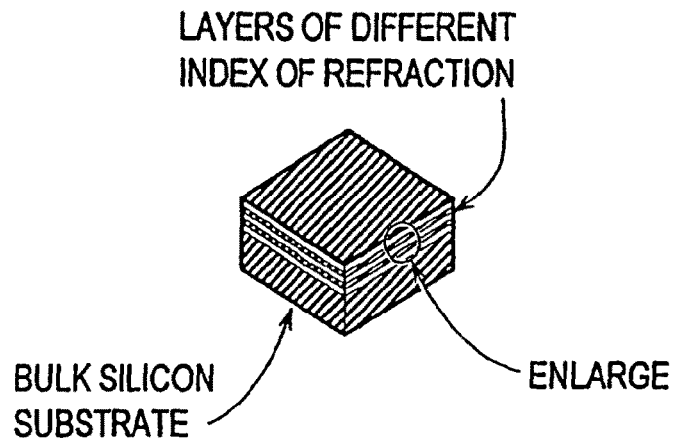
FIGS. 12A through 12J show concepts for using porous silicon filters for multiplexing and de-multiplexing.
Figure 12B:
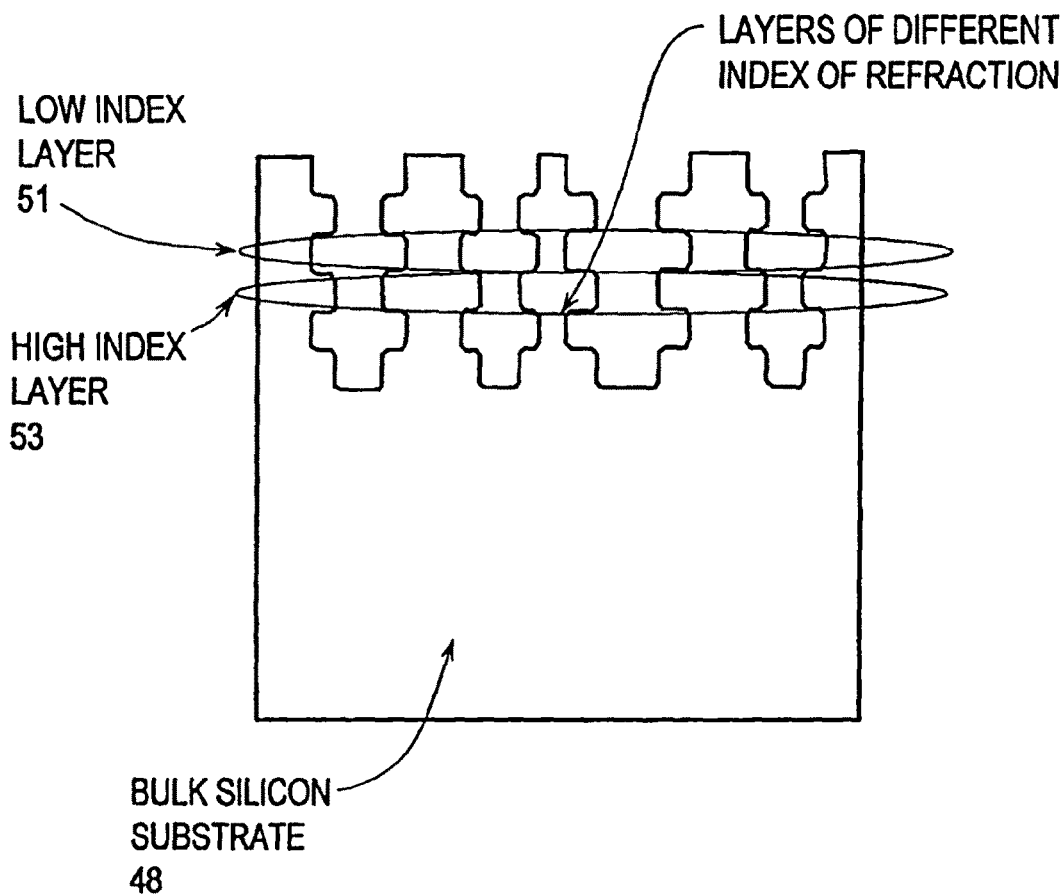
Figure 12C:
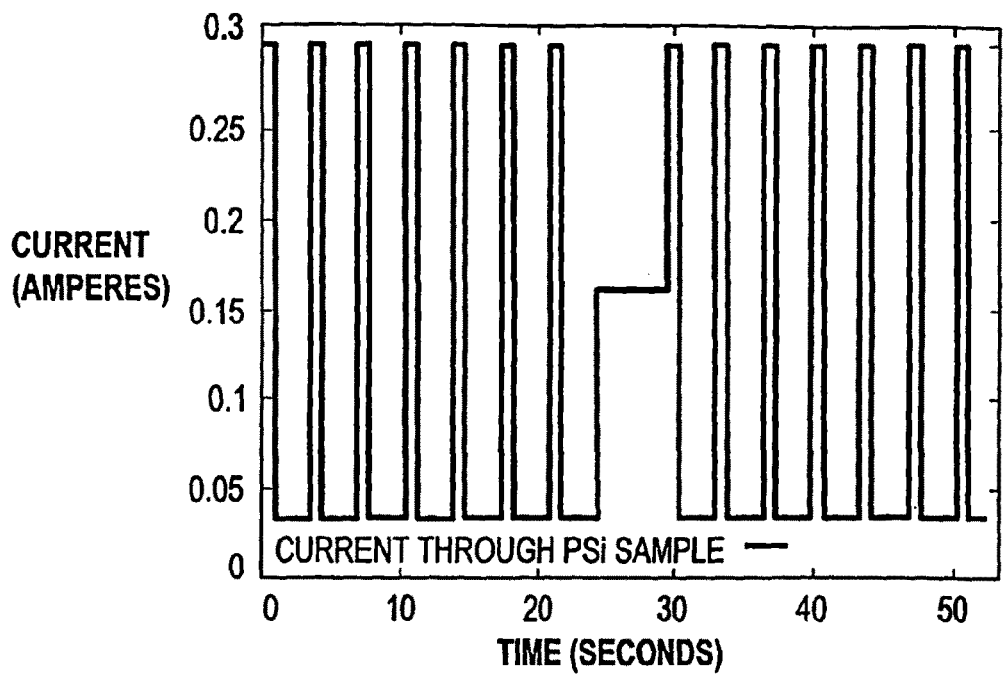
Figure 12D:
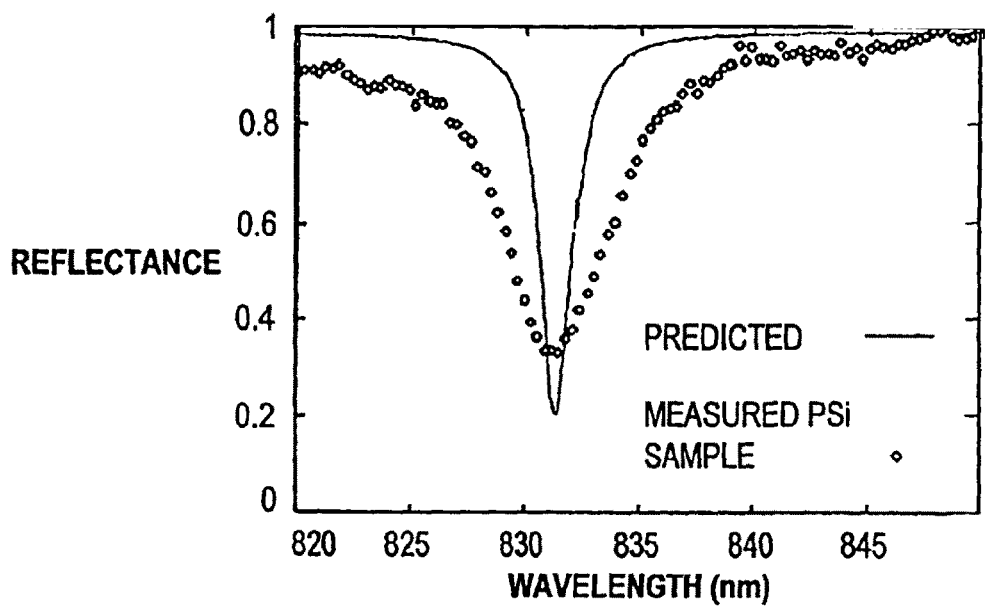
Figure 12E:
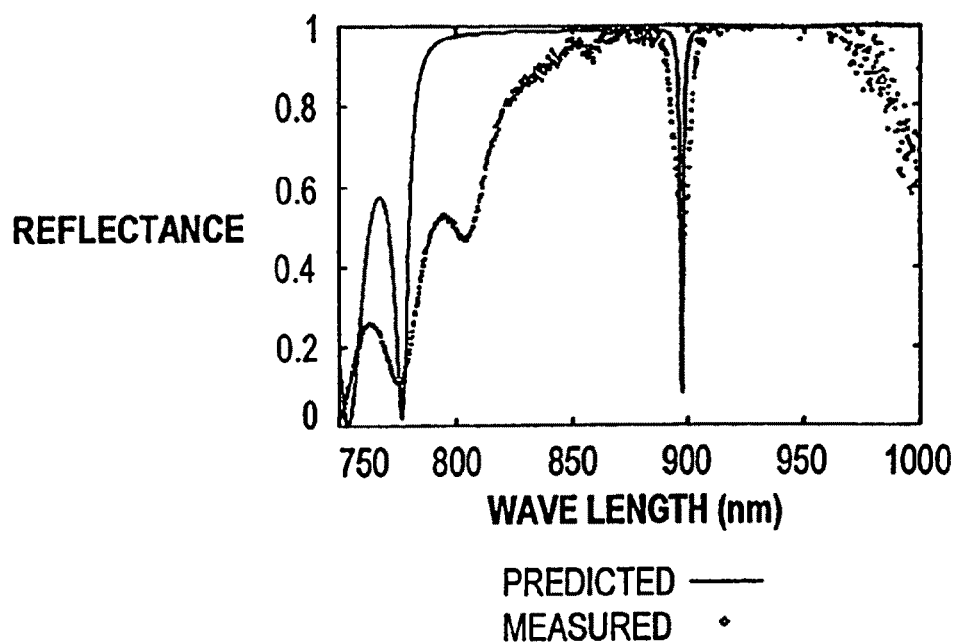
Figure 12F:
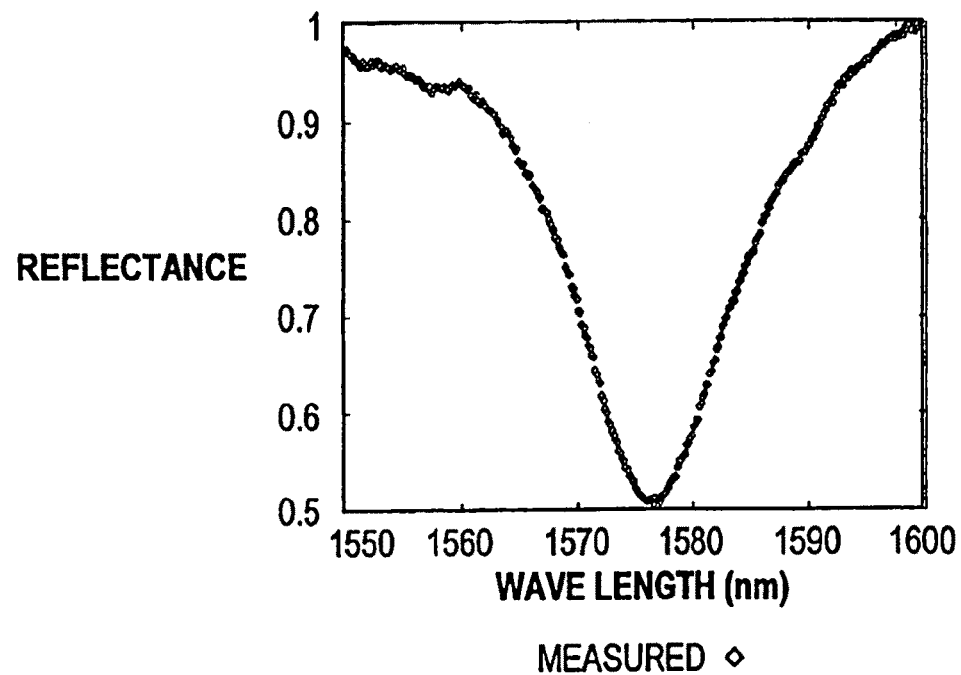

FIG. 12A is a depiction of a portion of a silicon wafer with six layers of varying index of refraction etched in its surface with an electric current supported acid etch porous silicon technology. Porous silicon (PSi) technology is an emerging technology that has many potential applications. A silicon wafer is submerged in hydrofluoric acid (HF) and a current is passed through it. The HF reacts with the silicon and etches nano-pores into the surface. The diameter of the pores is determined by 3 parameters: the current, the HF concentration, and the dopant level of the silicon. Preferred HF concentrations are in the range of about 25 percent to about 50 percent. Preferred silicon doping is about $2.5 \times 10^{16}$ ions/cm$^3$ to about $2.5 \times 10^{17}$ ions/cm$^3$. The etching always occurs at the interface between the HF solution and the silicon substrate at the bottom of the pores. This makes it possible to etch deep into the silicon and form a thick layer of PSi. The diameter of the pores can be changed during the etching process by varying the current. A larger current increases the diameter of the pores, and a smaller current decreases their diameter. In this manner the porosity of the silicon can be varied as a function of depth. Larger porosity (larger diameter pores) makes the silicon less dense which decreases the index of refraction of the PSi layer. And smaller porosity increases the index. Hence, the index of refraction of the PSi can be varied. This ability to vary the index as a function of depth enables the formation of optical filters. FIG. 12B is a drawing showing the general shape of the pours (produced in a silicon substrate 48) greatly magnified in a surface simulating 12 layers. Silicon has an index of refraction of about 3.5 and air has an index of refraction of about 1.00. Since the light we are concerned with has wavelengths much larger than the pores, the light responds to each simulated layer as if it had an index of refraction equal to the weighted average of the air and the silicon volume making up each layer. For example, a low index of refraction is indicated at 51 and a high index of refraction is indicated at 53. FIG. 12C shows a graph of current and time utilized to produce the pattern shown in FIG. 12B and FIG. 12D shows the reflectance from the surface of light at wavelengths of 820 nm to 850 nm. This filter was made with 24 layers as indicated in FIG. 12C. The filter can be made narrower by additional layers. FIG. 12 E shows the results with 29 layers. FIG. 12F is a reflection graph of a porous silicon designed for the wavelength range regularly used for fiber optic communication.

Rugate Porous Silicon Filters

Figure 12G:
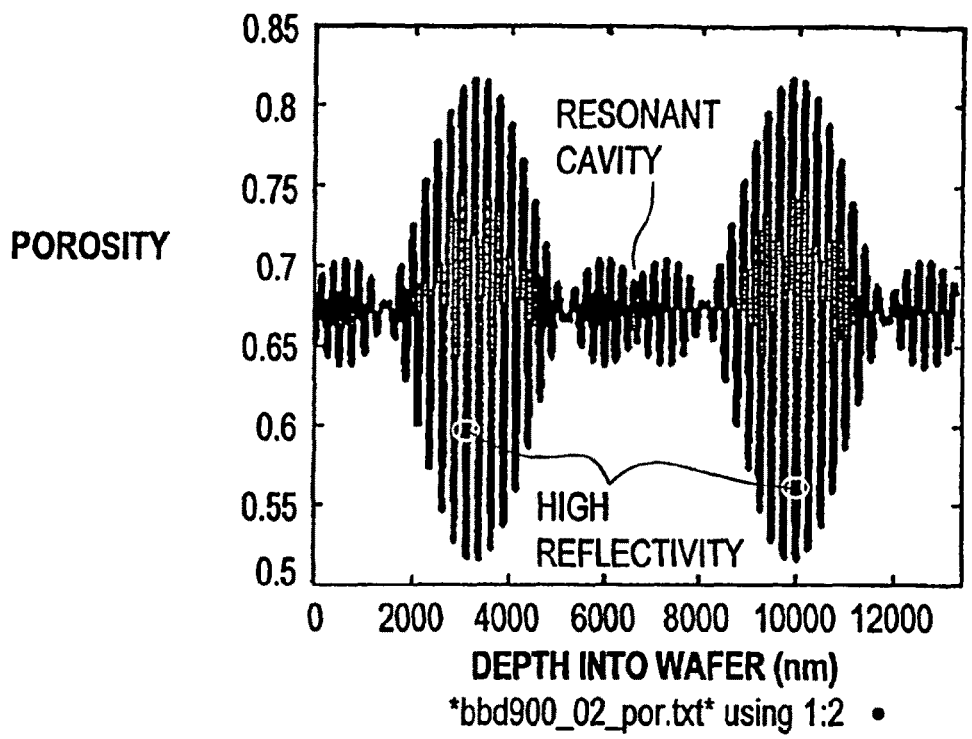
Figure 12H:
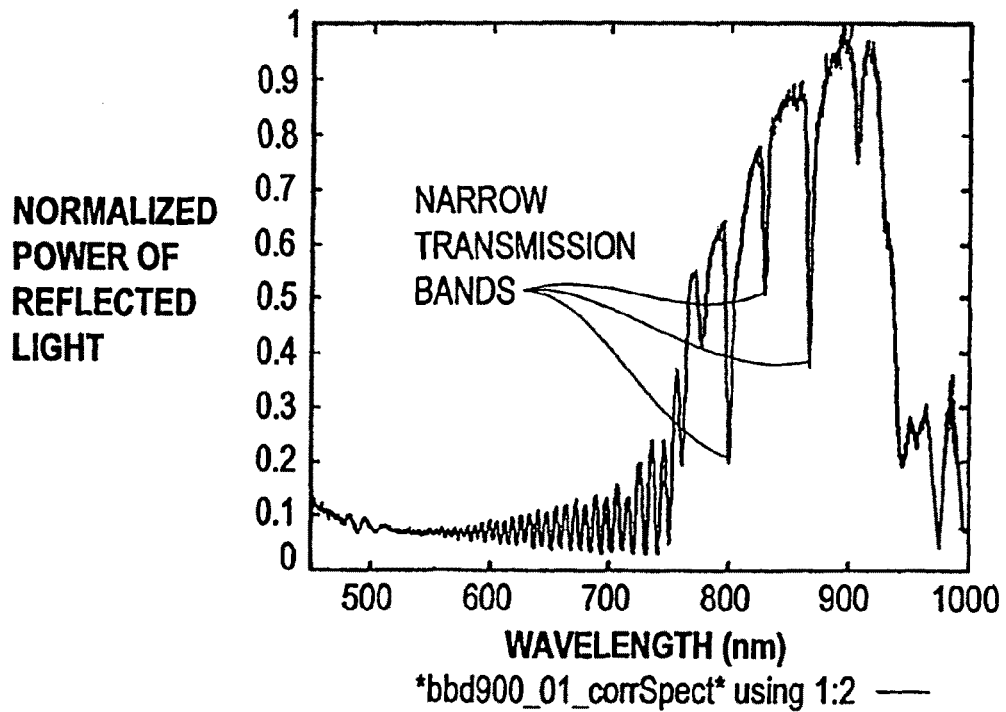

The types of filter that can be formed in PSi is intriguing. Traditional thin-film filters are made by alternating between thin (quarter-wave thick) layers of a high index material and a low index material. In PSi the index variation oscillates continuously between a high and a low value. This type of filter is called a "Rugate filter". Some interesting effects can be achieved, such as eliminating unwanted side-lobes from a narrow band-pass filter. FIG. 12G shows porosity vs depth in the wafer of a Rugate filter made by Applicants and FIG. 12H shows the resulting reflection profile as a function of wavelength. The graph shows three very narrow transmission bands.

Figure 12I:
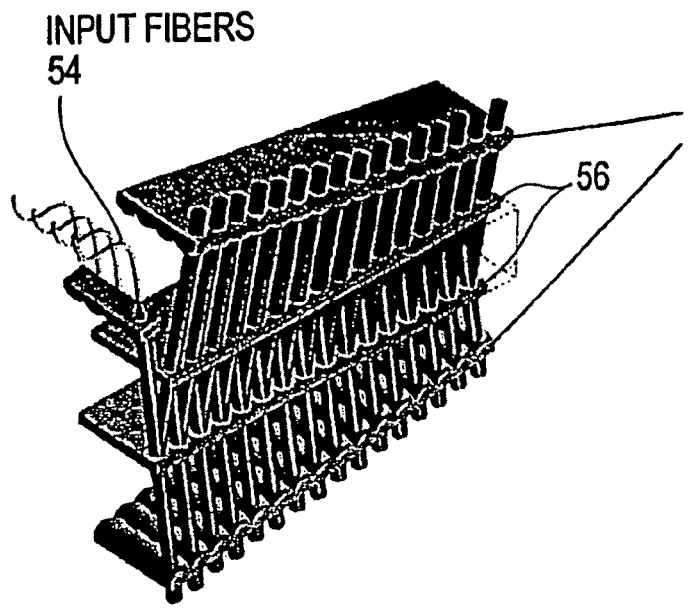
Figure 12J:
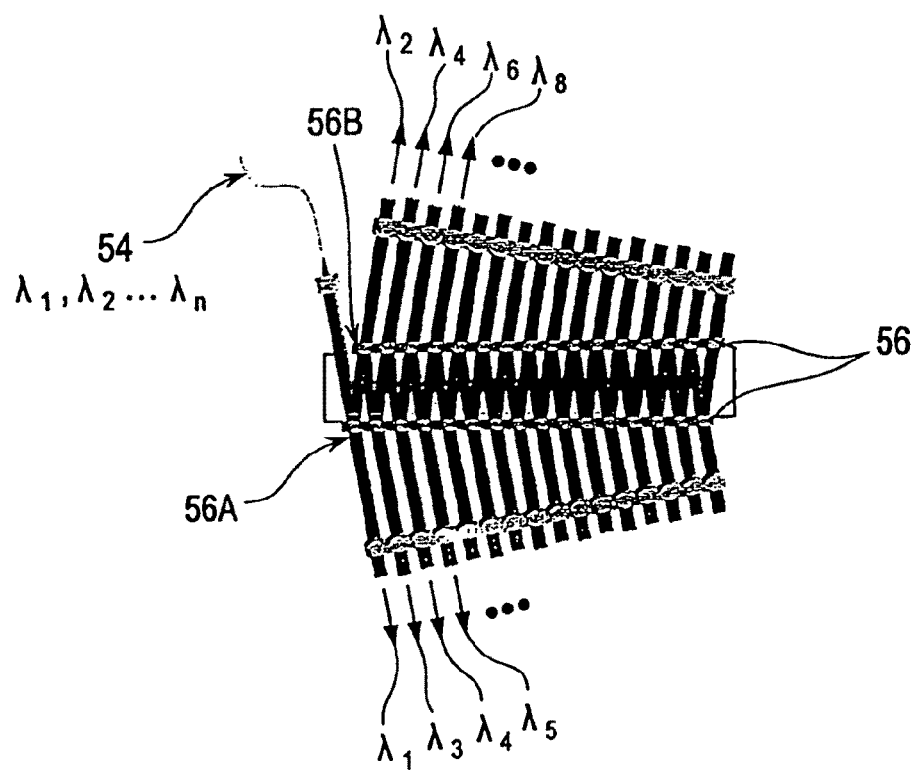
Figure 13A:
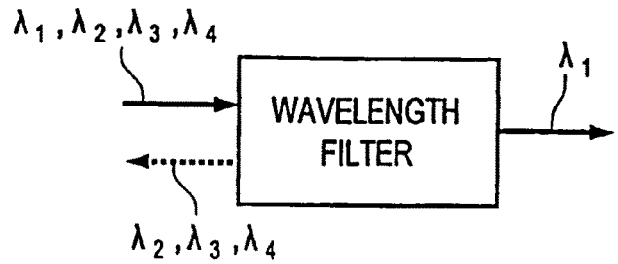
FIG. 13A through 13I show prior art multiplexing techniques.
Figure 13B:
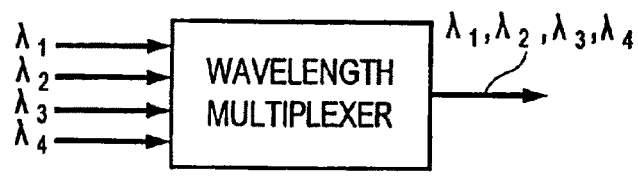
Figure 13C:
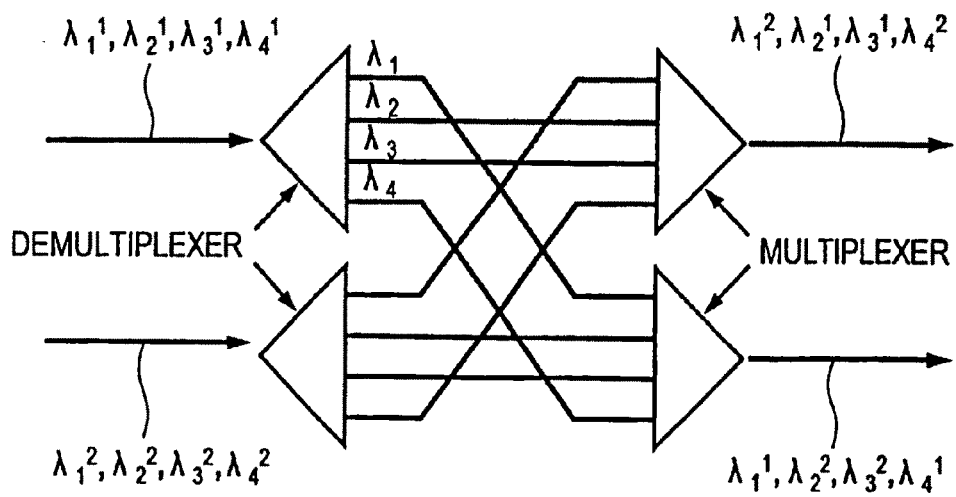
Figure 13D:
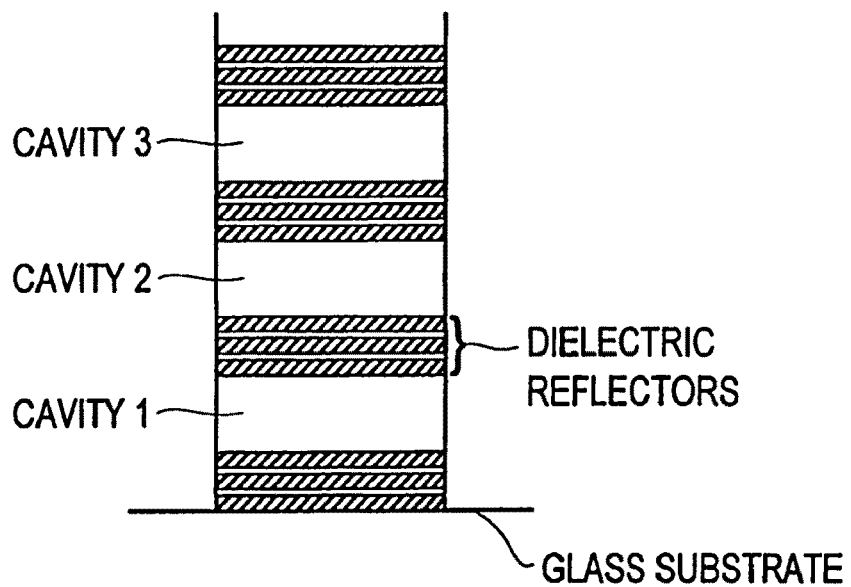
Figure 13E:
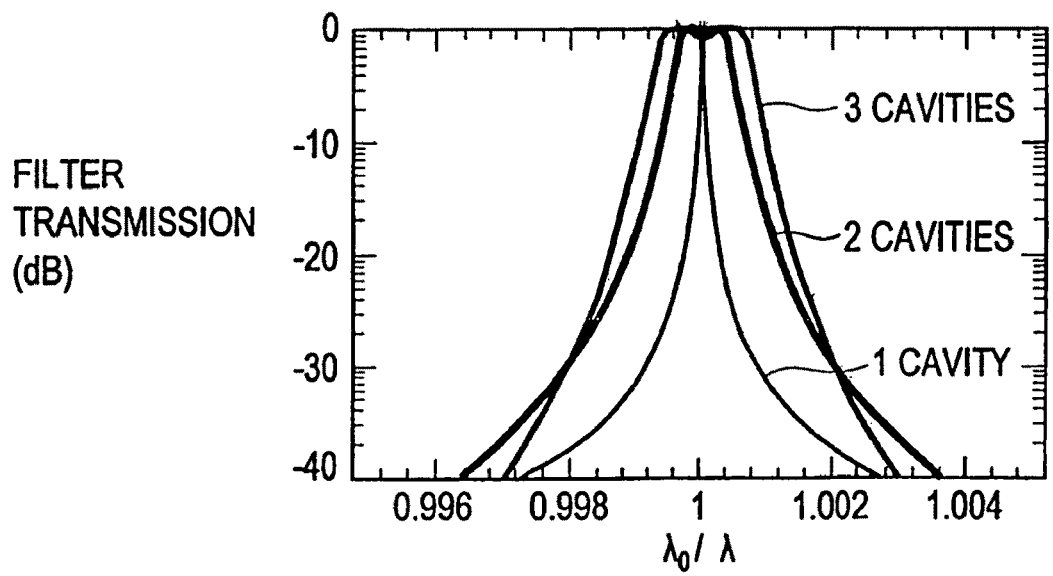
Figure 13F:
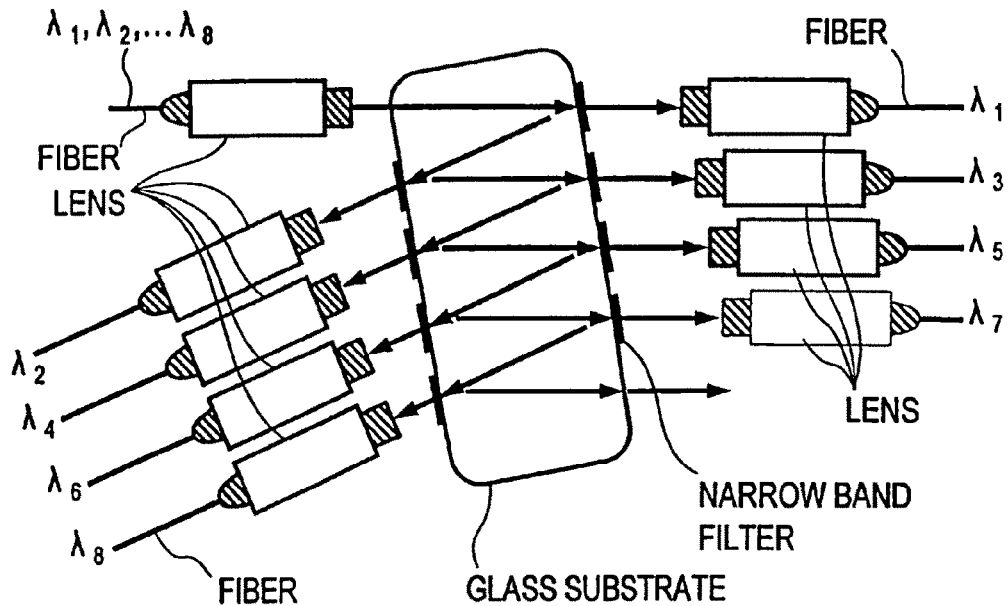
Figure 13G:
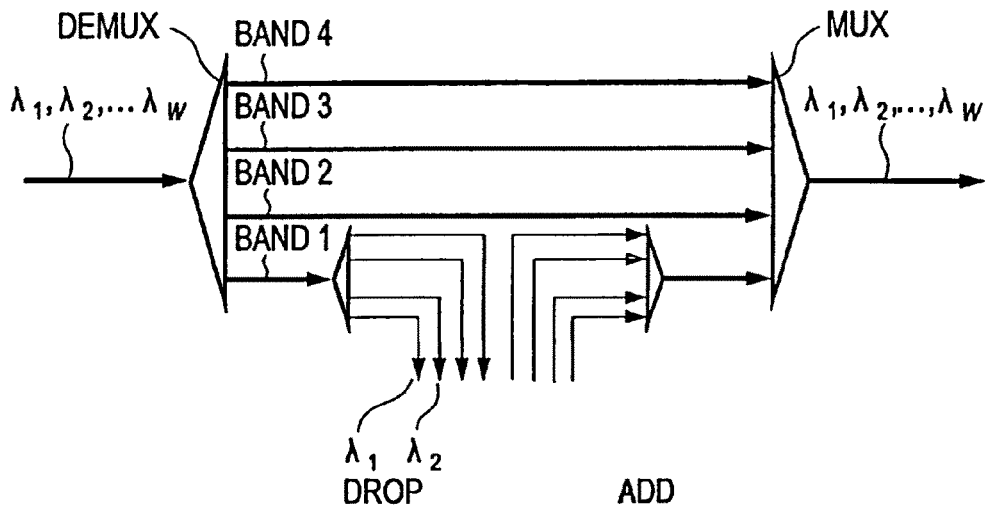
Figure 13H:
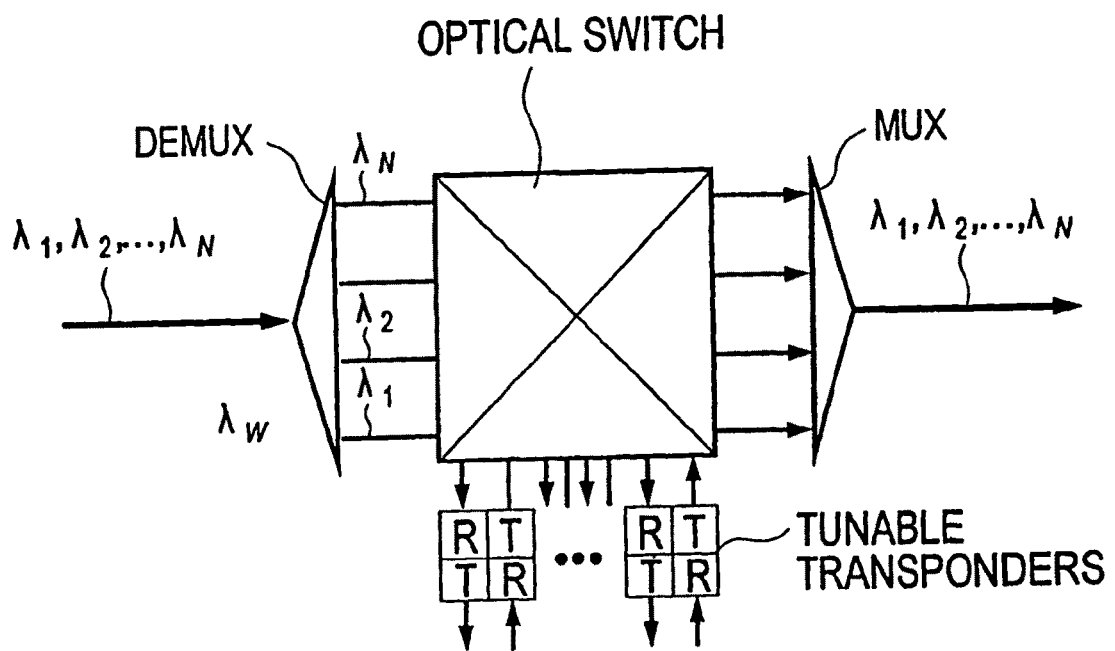
Figure 13I:
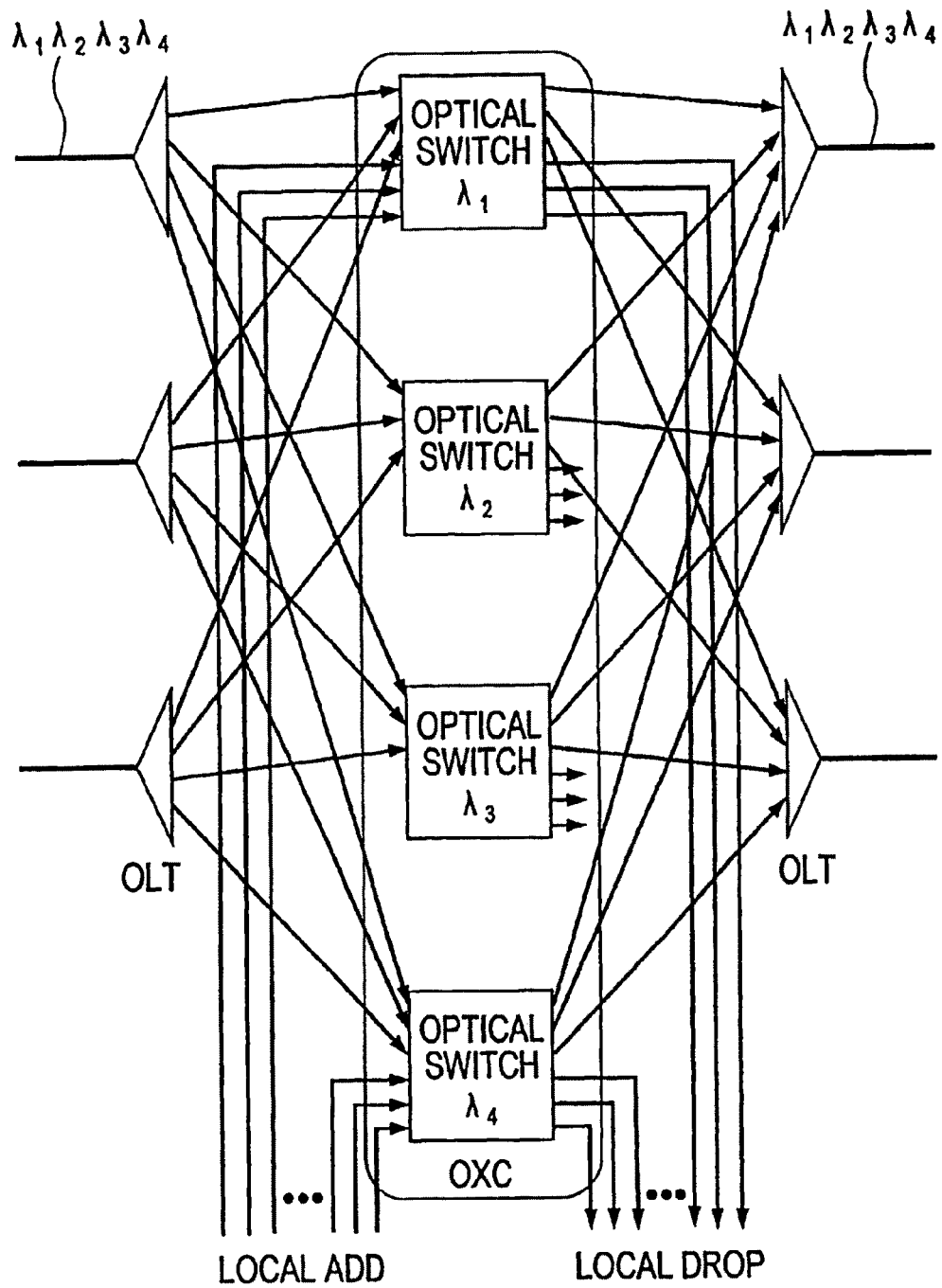

FIGS. 12I and 12J show how porous silicon filter unit can be arranged for multiplexing and de-multiplexing. FIG. 12I shows four fibers 54 providing an incoming communication beam comprising many signals at wavelength bands $\lambda_1$, $\lambda_2 \ldots \lambda_n$. Porous silicon filters designed to transmit individual wavelength are shown at 56. For example, filter 56A transmits wavelength range $\lambda_1$ and reflects all other wavelength bands. Filter 56B transmits another wavelength band and reflects all other wavelength bands. The wavelength bands are focused into individual optical fiber by lens arrays 58. This design as shown in FIGS. 12I and 12J uses a series of very narrow-band filters to sequentially separate one wavelength channel at a time from the DWDM beam. At each filter the selected channel is transmitted and the remaining wavelengths are reflected. If visible light is used the silicon substrate may be thinned or removed so that the transmitted light is not completely absorbed. For most optical telecommunications applications silicon is basically transparent to the wavelengths used and the silicon substrate may remain if the doping concentration is not too high. This filtering technique is conceptually simple but may not be the best for DWDM systems with a large number of wavelength channels since the final wavelength must encounter N−1 (N is the total number of wavelength channels in the DWDM beam) filters before it is separated from all other wavelengths.

More complicated designs can reduce the total number of filters that any one beam must pass through by having the first several filters transmit more than one wavelength channel. Narrowband filters may then be used to separate the individual wavelength channels from the decimated beams.

Many different prior art Rugate filter designs developed for thin film filters can be used with the porous silicon technique to achieve a narrowband filter with the specifications required for DWDM use. With the porous silicon technique Applicants can simulate stacks of thin film filters by producing multiple series of varying index layers that vary sinusoidally. This is equivalent to the fabrication of two or more relatively broadband reflectors on top of each other. This configuration is the Rugate filter equivalent to the multi-cavity filters found in commercial, discrete, thin-film dielectric filters. This type filter can achieve extremely good wavelength resolution without prohibitive length due to its emulation of Fabry-Perot etalon resonant cavities.

Stacking the filters on top of each other produces index of refraction profile that is extremely high across the C band except for a few very narrow wavelength regions that correspond to the resonant bands of the combined filter structure. This is where the phase change on transmission through the broadband filter matches the phase change on reflection from the second broadband filter. The exact wavelength and width of these transmission regions can be controlled, within a limited range by the design of the length and index profile of the broadband reflective filters.

Detection of Secret Wavelength

The present invention can be easily adapted to detect the presence of a tracker wavelength. These special tracker wavelengths can be added to a communication beam in order to track the beam as it makes its way through a completed optical route. The present invention can easily be programmed to periodically extract beams in each fiber to direct it to a testing unit to test for the tracker wavelength.

Adjusting Beam Intensity

Another useful application of the present invention is that it can be easily programmed to adjust the intensity of particular beams. It is important in communication systems that the intensity of various beams in a system be relatively uniform in intensity, especially just prior to amplification. The present invention can easily reduce the intensity of any beam passing through the switch by merely slightly misaligning the beam using units 16 and 18 to provide just the desired amount of misalignment. The more the beam is misaligned the more the beam is attenuated because smaller portions of it are focused into the output fiber.

Other Sizes

In the present embodiment, the configuration is an 8×16 array designed to be used to connect 8×16 fiber optic bundles. However, readers should appreciate that the present invention may be scaled to many other sizes, smaller or larger, without any significant increase in complexity of the manufacturing, alignment, or corresponding control system. Also additional or fewer spare channels may be provided based on experience.

Other Variations

While there have been shown what are presently considered to be preferred embodiments of the present invention, it will be apparent to those skilled in the art that various changes and modifications can be made herein without departing from the scope and spirit of the invention. For example, the switch shown in FIG. 1A could be scaled up or down as desired. The field programmable gate arrays used to control the mirrors can be replaced with more economical integrated circuits. The MEMS mirrors may be controlled with other variable voltage sources and larger capacitors could be utilized. Many types of automatic controls can be incorporated into the switches or used to control the switches. Filters other than porous silicon filters such as thin film filters could be used for multiplexing and de-multiplexing. Fewer or more or zero spare channels could be provided. The source of the alignment beam may be a resonant cavity light emitting diode. In some embodiments alternate alignment techniques could be used. Many other techniques are available for aligning an alignment beam with the communication beam in each fiber of the switch. There are many alternate methods of arranging the incoming fibers in the input portion of the switch. Small mirror arrays other than MEMS mirror arrays could be substituted for the MEMS mirror arrays. One processor could be used instead of the two shown in FIGS. 1A and 1B. There are a large number of applications for the present invention other than the two important ones discussed in detail. For example, the switch could be used in local intra-office or intra-factory communication systems where very high data rate communication is important. Signal grooming features, gain control and amplifiers could be incorporated into the switch. ROADM units of the present invention can be used to support express local and regional communication traffic. The switch of the present invention can be utilized in all of the system architectures including point-to-point, ring (hubbed and meshed). Therefore, the scope of the patent should be determined by the appended claims and their legal equivalence and not by the examples that have been given.

We claim:

1. A beam direction sensor system for determining the direction of each beam in an array of light beams, said sensor system comprising:
   A) a screen positioned to intersect the array of beams and
   B) a video camera to record the position of the images of the intersections;
   wherein said sensor defining a first sensor and a second similar sensor are components of an optical switch module for connecting optical fibers in a first set of optical fibers to optical fibers in a second set of fibers, said optical switch module comprising:
   A) a first fiber-microlens positioning array for precisely positioning optical fibers in said first set of optical fibers in a first fiber-microlens array pattern and a second fiber-microlens positioning array for precisely positioning optical fibers in said second set of optical fibers in a second fiber-microlens array pattern,
   B) a first MEMS mirror array comprising an array of MEMS mirrors arrayed in a first MEMS mirror pattern corresponding to said first fiber-microlens array pattern and positioned to reflect communication light beams to and/or from optical fibers arrayed in said first fiber-microlens positioning array and a second MEMS mirror array comprising an array of MEMS mirrors arrayed in a second MEMS mirror pattern corresponding to said second fiber-microlens array pattern and positioned to reflect communication light beams to and/or from optical fibers arrayed in said second fiber-microlens positioning array,
   C) a first alignment beam unit for providing an alignment beam for each communication beams between said first fiber-microlens array and said first MEMS array and co-aligning said alignment beams with the communication light beams, defining a first set of alignment beams, and a second alignment beam unit for providing an alignment beam for each communication beams between said second fiber-microlens array and said second MEMS array and co-aligning said alignment beams with the communication light beams, defining a second set of alignment beams,
   D) a dichroic mirror positioned and adapted to reflect communication beams from said first MEMS array to said second MEMS array and/or to reflect communication beams from said first MEMS array to said second MEMS array and to transmit said first and second set of alignment beams, and
   F) a MEMS control system for controlling positions of each mirror in said first and second MEMS mirror arrays in order to provide optical connections between each of the mirrors is said first set of optical fibers and any fiber in said second set of optical fibers and/or to provide optical connections between each of the mirrors is said second set of optical fibers and any fiber in said first set of optical fibers;
   wherein said first beam direction sensor is positioned and adapted to sense directions of each alignment beam in said first set of alignment beams transmitted through said dichroic mirror and said second beam direction sensor is positioned and adapted to sense directions of each alignment beam in said second set of alignment beams transmitted through said dichroic mirror.

2. The sensor system as in claim 1 wherein said screen is a holographic screen.

3. The sensor system as in claim 1 wherein said screen is a frosted glass screen.

4. The sensor system as in claim 1 wherein said screen is a screen having a grating pattern.

5. The sensor system as in claim 1 wherein said video camera comprises a CCD array.

6. The sensor system as in claim 1 wherein said video camera comprises a CMOS sensor.

7. The sensor system as in claim 1 wherein the two sensors are utilized in an optical cross connect switch to provide feedback for aligning communication beams within the optical switch module.

* * * * *